United States Patent [19]

Suzuki

[11] Patent Number: 5,481,625

[45] Date of Patent: Jan. 2, 1996

[54] HANDWRITTEN CHARACTER RECOGNITION DEVICE

[75] Inventor: Toshio Suzuki, Tokorozawa, Japan

[73] Assignee: Pioneer Electronic Corporation, Tokyo, Japan

[21] Appl. No.: 349,387

[22] Filed: Dec. 5, 1994

Related U.S. Application Data

[63] Continuation of Ser. No. 46,562, Apr. 12, 1993, abandoned.

[30] Foreign Application Priority Data

Apr. 15, 1992 [JP] Japan ..................... 4-095571

[51] Int. Cl.⁶ ..................................... G06K 9/00
[52] U.S. Cl. ................ 382/187; 382/179; 382/242; 382/197; 382/286
[58] Field of Search ..................... 382/187, 197, 382/202, 179, 224, 242, 243, 286, 276

[56] References Cited

U.S. PATENT DOCUMENTS

| | | | |
|---|---|---|---|
| 4,685,142 | 8/1987 | Ooi et al. | 382/13 |
| 4,813,078 | 3/1989 | Fujiwara et al. | 382/21 |
| 5,033,101 | 7/1991 | Sood | 382/38 |

*Primary Examiner*—Leo H. Boudreau
*Assistant Examiner*—David B. Anderson
*Attorney, Agent, or Firm*—Kane, Dalsimer, Sullivan, Kurucz, Levy, Eisele and Richard

[57] ABSTRACT

A handwritten character recognition device including: input unit for inputting handwriting thereon; stroke extracting unit for analyzing the handwriting in an X-axis and Y-axis direction, and extracting an X-axis and Y-axis direction input stroke; symbolizing unit for converting the X-axis direction input stroke into an X-axis direction symbol string and the Y-axis direction input stroke into a Y-axis direction symbol string; first storage unit for storing X-axis direction basic symbol strings corresponding to X-axis direction basic symbol strokes of reference characters, and Y-axis direction basic symbol strings corresponding to Y-axis direction basic symbol strokes of the reference characters; second storage unit for storing correlation coefficients between each of the symbols; degree-of-match calculating unit for calculating, by referring to the first storage unit and the second storage unit, X-axis correlation coefficients between the symbols forming the X-axis direction symbol string and the symbols forming the X-axis direction basic symbol string and Y-axis correlation coefficients between the symbols forming the Y-axis direction symbol string and the symbols forming the Y-axis direction basic symbol stroke, and for producing X-axis degrees-of-match on the basis of the X-axis correlation coefficients and Y-axis degrees-of-match on the basis of the Y-axis correlation coefficients; and recognizing unit for recognizing the character inputted to the input unit on the basis of the X-axis degree-of-match and Y-axis degree-of-match.

8 Claims, 24 Drawing Sheets

INPUT PATTERN a

REFERENCE PATTERN s

FIG.6

| gℓ: BEFORE | | AFTER | CHANGE |
|---|---|---|---|
| L | Y | any | L → Y |
| L | Z | any | ″ → Z |
| L | $\bar{O}$ | any | ″ → $\bar{O}$ |
| L | P | any | ″ → P |
| L | X | L,M,N | ″ → M |
| L | X | $\overline{L,M,N}$ | ″ → Y |
| L | X | | ″ → Y |
| L | Q | L,M,N | ″ → M |
| L | Q | $\overline{L,M,N}$ | ″ → Y |
| L | Q | | ″ → M |
| $\bar{O}$ | L | $\bar{O}$,P,Q | ″ → $\bar{O}$ |
| $\bar{O}$ | L | X − L,M,N | ″ → M |
| $\bar{O}$ | L | X − $\overline{L,M,N}$ | ″ → Y |
| $\bar{O}$ | L | X | ″ → $\bar{O}$ |
| $\bar{O}$ | L | Y | ″ → Y |
| $\bar{O}$ | L | Z | ″ → Z |
| $\bar{O}$ | L | | ″ → $\bar{O}$ |
| P | L | P | ″ → P |
| P | L | $\bar{O}$,Q | ″ → $\bar{O}$ |
| P | L | X − L,M,N | ″ → M |
| P | L | X − $\overline{L,M,N}$ | ″ → Y |
| P | L | X | ″ → P |
| P | L | Y | ″ → Y |
| P | L | Z | ″ → Z |
| P | L | | ″ → P |
| Y | L | $\bar{O}$,P,Q | ″ → Y |
| Y | L | X,Y | ″ → M |
| Y | L | Z | ″ → Z |
| Y | L | | ″ → Y |
| Z | L | Z,Q | ″ → Z |
| Z | L | $\bar{O}$,P | ″ → $\bar{O}$ |
| Z | L | X,Y | ″ → M |
| Z | L | | ″ → Z |

FIG. 7

| gm : BEFORE | AFTER | | CHANGE |
|---|---|---|---|
| Z | $\bar{O}$ | Z | $\bar{O} \to Z$ |
| Z | M | Z | $M \to Z$ |
| Y | M | any | $Y \to M$ |
| Y | N | any | $" \to N$ |
| Y | $\bar{O}$ | any | $" \to \bar{O}$ |
| Y | $\bar{P}$ | any | $" \to P$ |
| Y | L | X,Y | $" \to M$ |
| Y | L | Z | $" \to Z$ |
| Y | Q | X,Y | $" \to \bar{O}$ |
| Y | Q | Z | $" \to Z$ |
| $\bar{O}$ | Y | $\bar{O}$,P,Q | $" \to \bar{O}$ |
| $\bar{O}$ | Y | | $" \to \bar{O}$ |
| P | Y | P | $" \to P$ |
| P | Y | $\bar{O}$,Q | $" \to \bar{O}$ |
| P | Y | | $" \to P$ |
| M | Y | L,M,N | $" \to M$ |
| M | Y | | $" \to M$ |
| N | Y | N | $" \to N$ |
| N | Y | L,M | $" \to M$ |
| N | Y | | $" \to N$ |

FIG.11

| CATEGORY I | — , ) |
|---|---|
| CATEGORY II | ? , ⊃ |
| CATEGORY III | ∂ |

BASIC STROKE NUMBER : 57

FIG.14A

| 57: MATCHING IN X DIRECTION | | | | | | | | | |
|---|---|---|---|---|---|---|---|---|---|
| | m | n | m | y | o | p | o | y | m |
| m | (1.00) | 0.80 | 1.00 | 0.80 | 0.00 | ---- | ---- | ---- | ---- |
| n | ---- | (1.00) | (0.80) | 0.00 | ---- | ---- | ---- | ---- | ---- |
| y | ---- | ---- | 0.80 | (1.00) | (0.80) | 0.00 | ---- | ---- | ---- |
| p | ---- | ---- | ---- | ---- | 0.80 | (1.00) | (0.80) | 0.00 | ---- |
| y | ---- | ---- | ---- | ---- | ---- | ---- | 0.80 | (1.00) | (0.80) |
| Mx | 0.91 | | | | | | | | |

FIG.14B

| 57: MATCHING IN Y DIRECTION | | | | | | | | |
|---|---|---|---|---|---|---|---|---|
| | p | o | y | n | z | o | p | o |
| p | (1.00) | (0.80) | 0.00 | ---- | ---- | ---- | ---- | ---- |
| y | ---- | 0.80 | (1.00) | 0.00 | ---- | ---- | ---- | ---- |
| n | ---- | ---- | ---- | (1.00) | 0.00 | ---- | ---- | ---- |
| y | ---- | ---- | ---- | ---- | (0.80) | (0.80) | 0.00 | ---- |
| p | ---- | ---- | ---- | ---- | 0.00 | 0.80 | (1.00) | (0.80) |
| My | 0.90 | | | | | | | |

BASIC STROKE NUMBER : 49

FIG.14C

| 49: MATCHING IN X DIRECTION | | | | | | | | | |
|---|---|---|---|---|---|---|---|---|---|
| | m | n | m | y | o | p | o | y | m |
| p | (0.00) | (0.00) | (0.00) | (0.00) | (0.80) | ---- | ---- | ---- | ---- |
| m | ---- | 0.00 | 0.00 | 0.00 | 0.00 | 0.00 | ---- | ---- | ---- |
| p | ---- | ---- | 0.00 | 0.00 | 0.00 | (1.00) | (0.80) | ---- | ---- |
| y | ---- | ---- | ---- | ---- | ---- | ---- | 0.80 | (1.00) | ---- |
| o | ---- | ---- | ---- | ---- | ---- | ---- | ---- | ---- | (0.00) |
| Mx | 0.36 | | | | | | | | |

FIG.14D

| 49: MATCHING IN Y DIRECTION | | | | | | | | |
|---|---|---|---|---|---|---|---|---|
| | p | o | y | n | z | o | p | o |
| m | (0.00) | (0.00) | (0.80) | (0.80) | ---- | ---- | ---- | ---- |
| p | ---- | 0.00 | 0.00 | 0.00 | 0.00 | ---- | ---- | ---- |
| y | ---- | ---- | 0.00 | 0.00 | (0.80) | (0.80) | ---- | ---- |
| n | ---- | ---- | ---- | 0.00 | 0.00 | 0.00 | 0.00 | 0.00 |
| o | ---- | ---- | ---- | ---- | 0.00 | 0.00 | (0.80) | (1.00) |
| My | 0.52 | | | | | | | |

F I G. 15
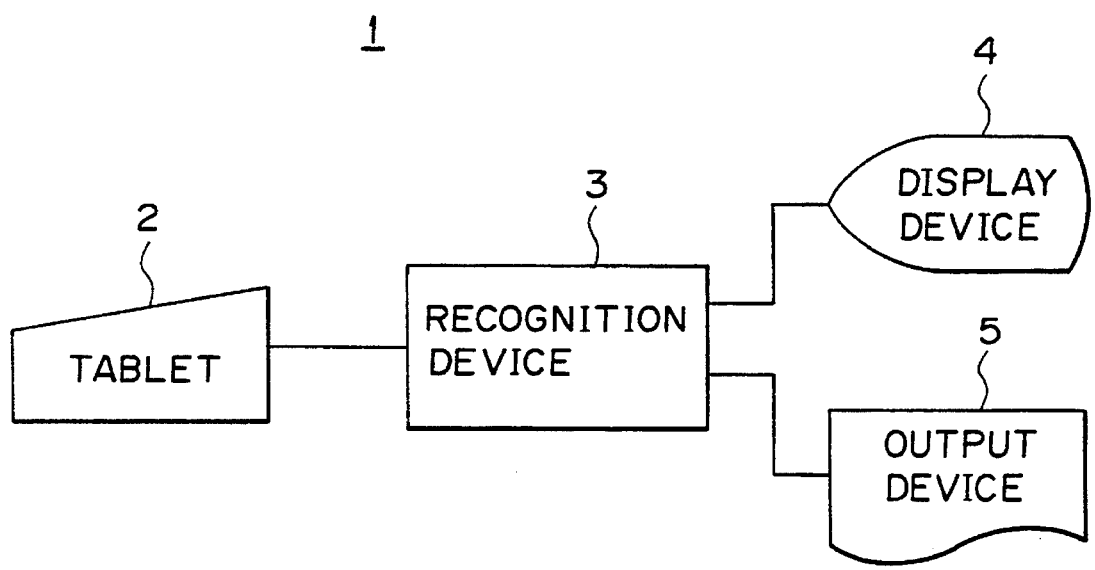

FIG. 17A
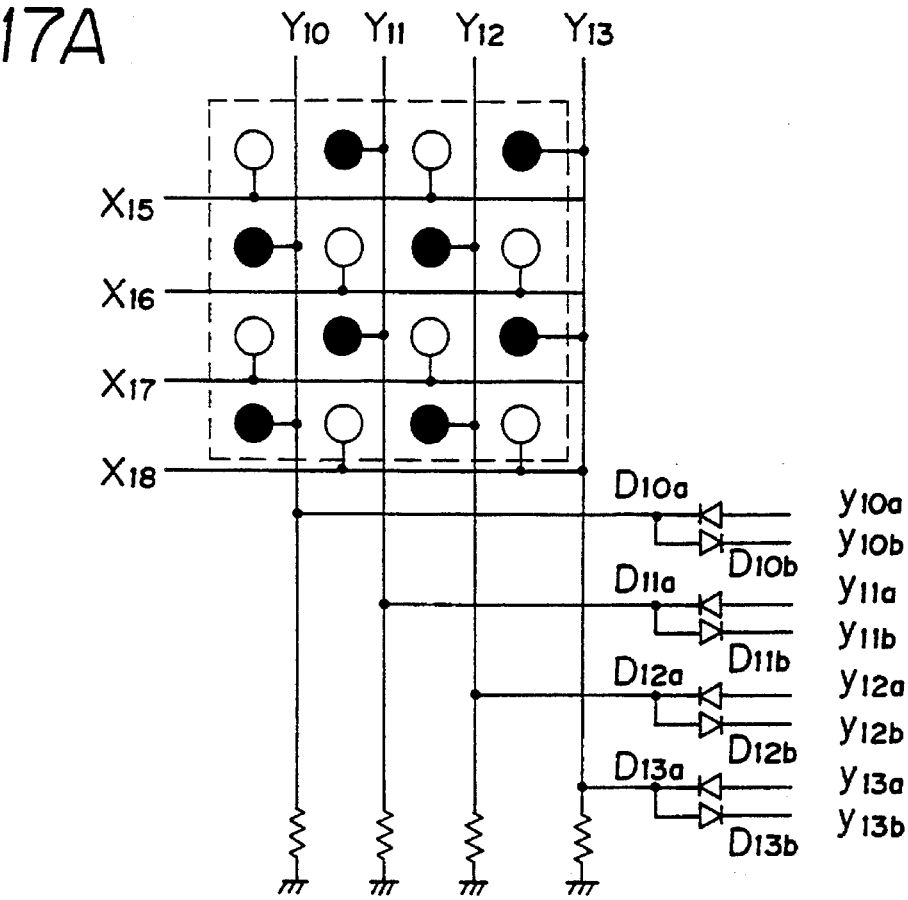
FIG. 17B  y10a 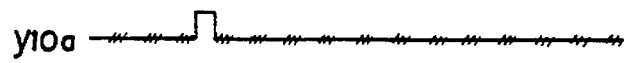
FIG. 17C  y11a 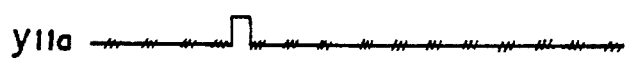
FIG. 17D  y12a 
FIG. 17E  y13a 
FIG. 17F  y10b~y13b 
FIG. 17G  X15~X18 
FIG. 17H  SIGNAL A 

FIG. 18
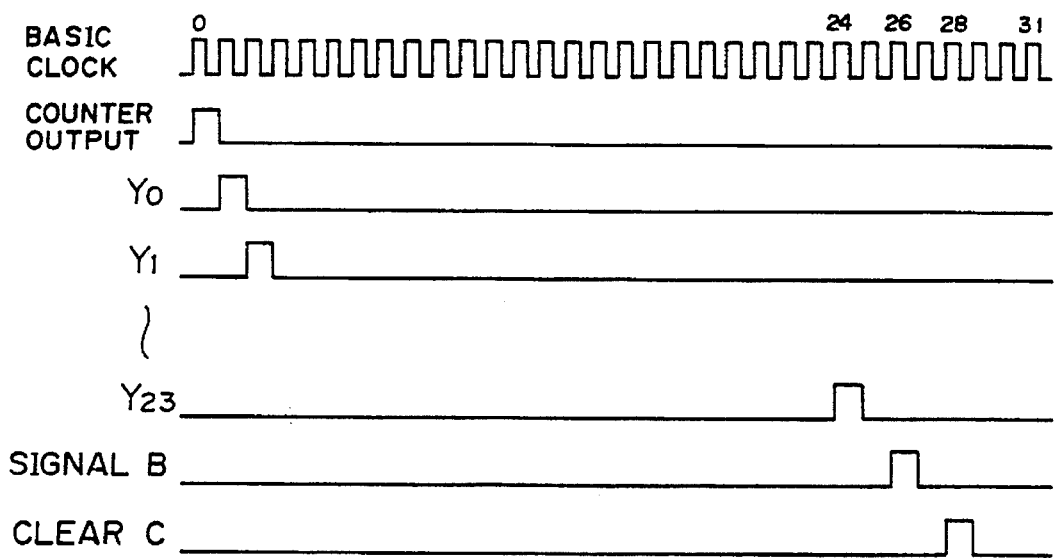
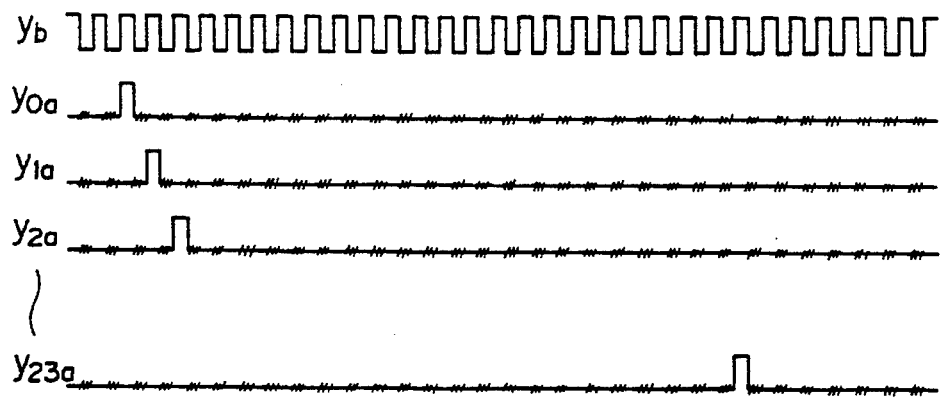
y0a~y23a : 3-STATE SIGNALS
⊥⊢ DENOTES HIGH-IMPEDANCE STATE
yb : INVERTED VERSION OF BASIC CLOCK
3 STATES : Hig, Low
Hig, Imp FIG. 19A  $X_{15} \sim X_{18}$ 
FIG. 19B  SIGNAL A 
FIG. 19C  $Y_{10}$ 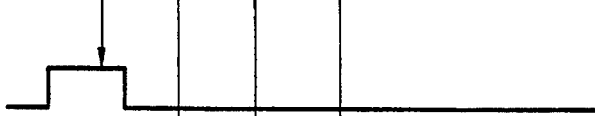
FIG. 19D  $Y_{11}$ 
FIG. 19E  $Y_{12}$ 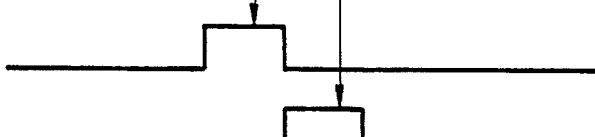
FIG. 19F  $Y_{13}$ 
SOLID LINE : NO yb
DOTTED LINE : yb IS PRESENT

FIG. 23A

|   | R | S | L |
|---|---|---|---|
| R | $\omega_0$ | $\omega_1$ | $\omega_2$ |
| S | $\omega_1$ | $\omega_0$ | $\omega_1$ |
| L | $\omega_2$ | $\omega_1$ | $\omega_0$ |

FIG. 23B

|   | U | S | D |
|---|---|---|---|
| U | $\omega_0$ | $\omega_1$ | $\omega_2$ |
| S | $\omega_1$ | $\omega_0$ | $\omega_1$ |
| D | $\omega_2$ | $\omega_1$ | $\omega_0$ |

INPUT PATTERN

REFERENCE PATTERN

FIG. 25

(INPUT PATTERN)

| X | R | S | L | S | R |
|---|---|---|---|---|---|
| R | ω0 | ω1 | ω2 | ... ... | ... ... |
| L | ... ... | ω1 | ω0 | ... ... | ... ... |
| S | ... ... | ... ... | ... ... | ω0 | ... ... |
| R | ... ... | ... ... | ... ... | ... ... | ω0 |

(REFERENCE PATTERN)

HANDWRITTEN CHARACTER RECOGNITION DEVICE

This application is a continuation of application Ser. No. 08/046,562, filed Apr. 12, 1993, now abandoned.

BACKGROUND OF THE INVENTION

1. Field of the Invention

The present invention generally relates to a handwritten character recognition device, and more particularly to an on-line handwritten character recognition device that recognizes handwritten characters inputted in an on-line manner.

2. Description of the Prior Art

FIG. 1 is a block diagram showing an overview operation of an on-line handwritten character recognition device. In an operation, a character is inputted to the device by means of an input device, such as a tablet, in step S100. Preprocessing such as noise elimination is carried out for the input character data in order to facilitate extraction of an input pattern in step S101. Basic patterns forming the input character are extracted from the input character after the preprocessing, and features of the input character are extracted from the respective basic patterns of the input character in step S102. After that, postprocessing is performed, if necessary. A structure analysis at a whole character level is carried out, and the input character is recognized in step S103. The recognized input character is outputted to an output device, such as a display or a printer in step S104.

As character recognition methods for the on-line handwritten character recognition device, a pattern matching method and a dynamic programming (hereinafter simply referred to as "DP") method are known.

[i] Pattern Matching Method

The pattern matching method is the principal method of pattern recognition, and directly compares two patterns (an input pattern and a reference pattern) with each other. More particularly, there are a minimum distance identification method, and a degree-of-similarity identification method.

FIGS. 2B and 2C respectively illustrate examples of an input pattern and a reference pattern used in the minimum distance identification method, which is one of the pattern matching methods.

A match-degree $g^{(a,s)}$ expressed in the following equation is obtained using the patterns shown in FIGS. 2B and 2C:

$$g^{(a,s)} = \left[ \sum_{i=1}^{n} (Xai - Xsi)^2 \right]^{1/2}$$

where Xai denotes pixel data of the input pattern, and Xsi denotes pixel data of the reference pattern. The input pattern is compared with a plurality of reference patterns, and one of the reference patterns having the smallest match-degree is identified.

[ii] DP Method

In the DP method, the input pattern is divided into a plurality of parts, and patterns contained in the respective parts are symbolized. Then, a reference pattern is obtained from a sequence of symbols, using an identification automaton theory.

The above-mentioned pattern matching method is greatly affected by deformation of the input pattern. Hence, preprocessing and postprocessing are required to correct the deformation of the input pattern. Further, the reference patterns stored in a dictionary for comparison consist of pixels, and hence it is necessary for the dictionary to have at least the following storage capacity (see FIG. 2A):

Storage capacity=(number Pl of pixels in the longitudinal direction)×(number Pc of pixels in the lateral direction)× (number of reference patterns). Hence, the large capacity is required for the dictionary.

The DP method is not affected by deformation of the input pattern. However, the DP method needs a long operation time.

SUMMARY OF THE INVENTION

It is an object of the present invention to provide a handwritten character recognition device which is not affected by deformation of the input pattern and can use a decreased dictionary capacity.

According to one aspect of the present invention, there is provided a handwritten character recognition device including: input unit for inputting handwriting of character by writing the character thereon; stroke extracting unit for analyzing the handwriting in an X-axis direction and in a Y-axis direction, and extracting an X-axis direction input stroke and a Y-axis direction input stroke; symbolizing unit for converting the X-axis direction input stroke into an X-axis direction symbol string and the Y-axis direction input stroke into a Y-axis direction symbol string, each of the symbol strings including one or a plurality of symbols; first storage unit for storing X-axis direction basic symbol strings each including one or a plurality of symbols corresponding to X-axis direction basic symbol strokes of reference characters, and Y-axis direction basic symbol strings each including one or a plurality of symbols corresponding to Y-axis direction basic symbol strokes of the reference characters; second storage unit for storing correlation coefficients between each of the symbols; degree-of-match calculating unit for calculating, by referring to the first storage unit and the second storage unit, X-axis correlation coefficients between the symbols forming the X-axis direction symbol string and the symbols forming the X-axis direction basic symbol string and Y-axis correlation coefficients between the symbols forming the Y-axis direction symbol string and the symbols forming the Y-axis direction basic symbol stroke, and for producing X-axis degrees-of-match on the basis of the X-axis correlation coefficients and Y-axis degrees-of-match on the basis of the Y-axis correlation coefficients; and recognizing unit for recognizing the character inputted to the input unit on the basis of the X-axis degree-of-match and Y-axis degree-of-match.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is another diagram illustrating the process for redefining symbols;

FIG. 7 is still another diagram illustrating the process for redefining symbols;

FIG. 11 is a diagram illustrating conditions (categories) used for feature extraction;

FIGS. 14A–14D are diagrams showing the results of the degree-of-match computation process;

FIG. 15 is a block diagram showing an overview of an on-line handwritten character recognition device;

FIG. 17A is a diagram of a detection circuit, and FIGS. 17B–17H are timing charts of the detection circuit;

FIG. 18 is a timing chart of input and output signals of the detection circuit;

FIGS. 19A–19F comprise another timing chart of the input and output signals of the detection circuit;

FIGS. 23A and 23B are diagrams for explaining correlation coefficients;

FIG. 25 is a diagram illustrating correlation coefficients between an input pattern and a reference pattern.

DESCRIPTION OF THE PREFERRED EMBODIMENT

A description will be given of an embodiment of the present invention with reference to FIGS. 3 through 25.

[I] Description of Principle

Before explaining an embodiment of the present invention in detail, the principle of the embodiment will be described with reference to FIGS. 3 through 14.

Figure 1:
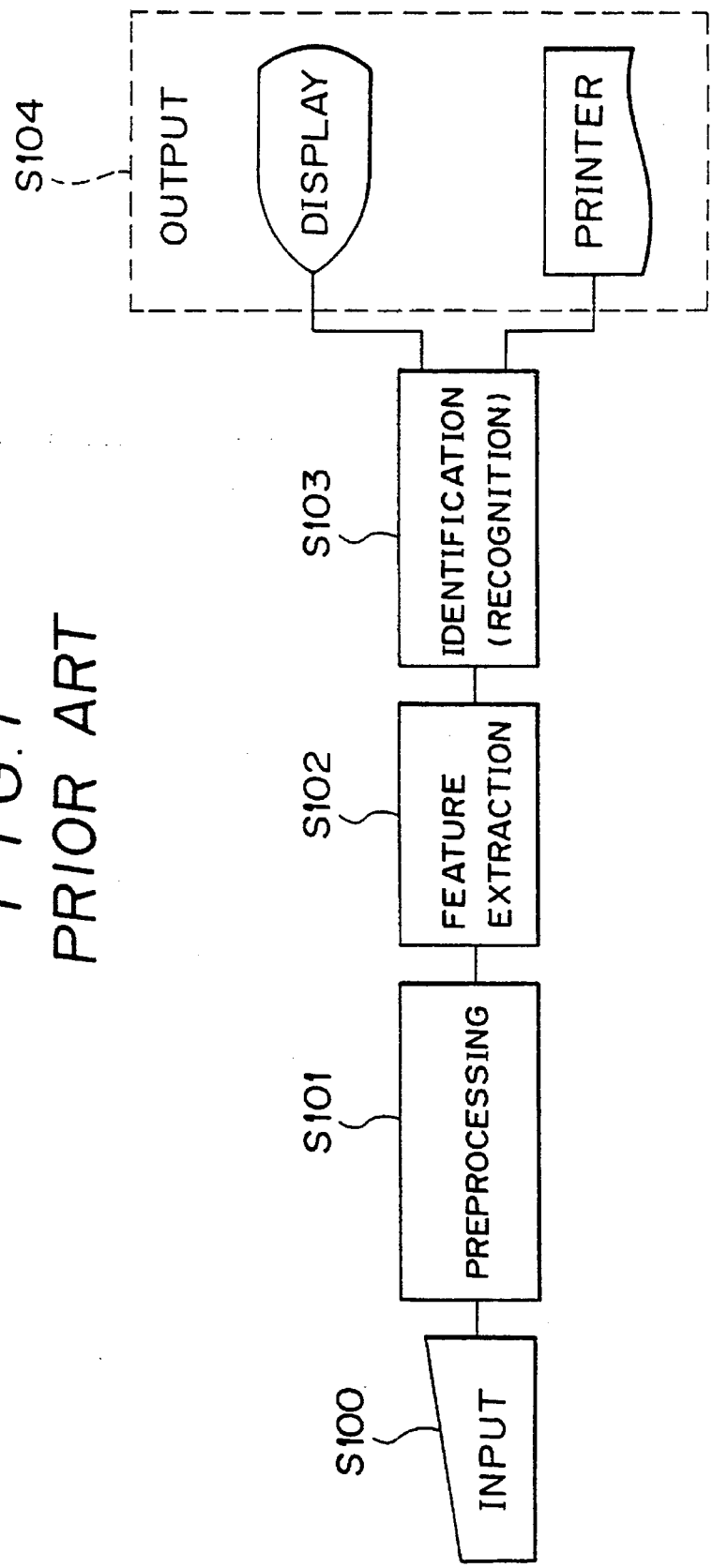
FIG. 1 is a block diagram of an on-line handwritten character recognition device.
Figure 2A:
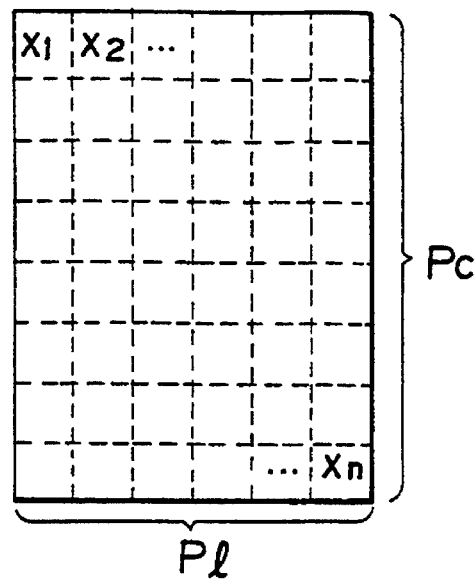
FIGS. 2A, 2B and 2C are diagrams illustrating a pattern matching method.
Figure 2B:
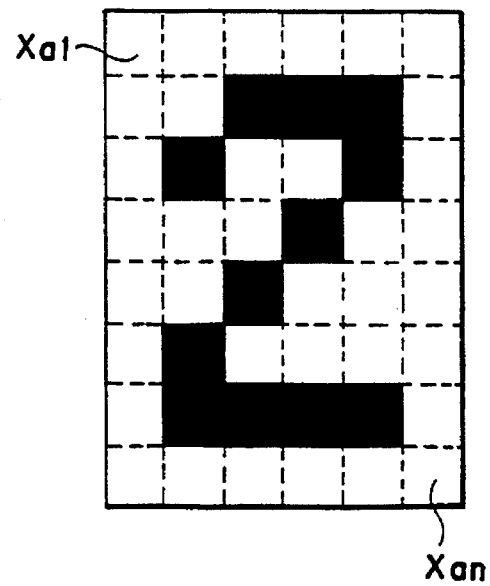
Figure 2C:
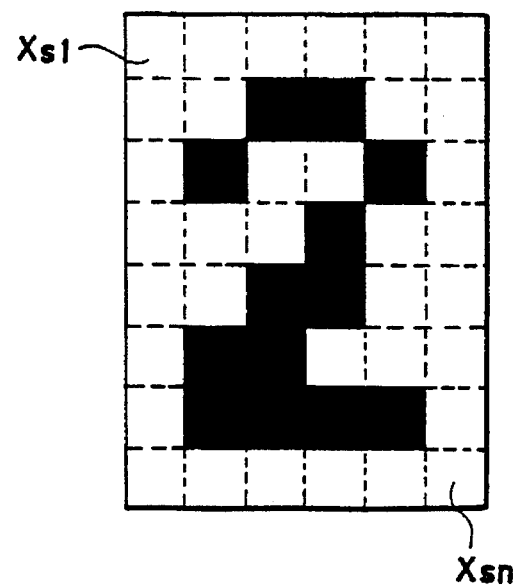
Figure 3:
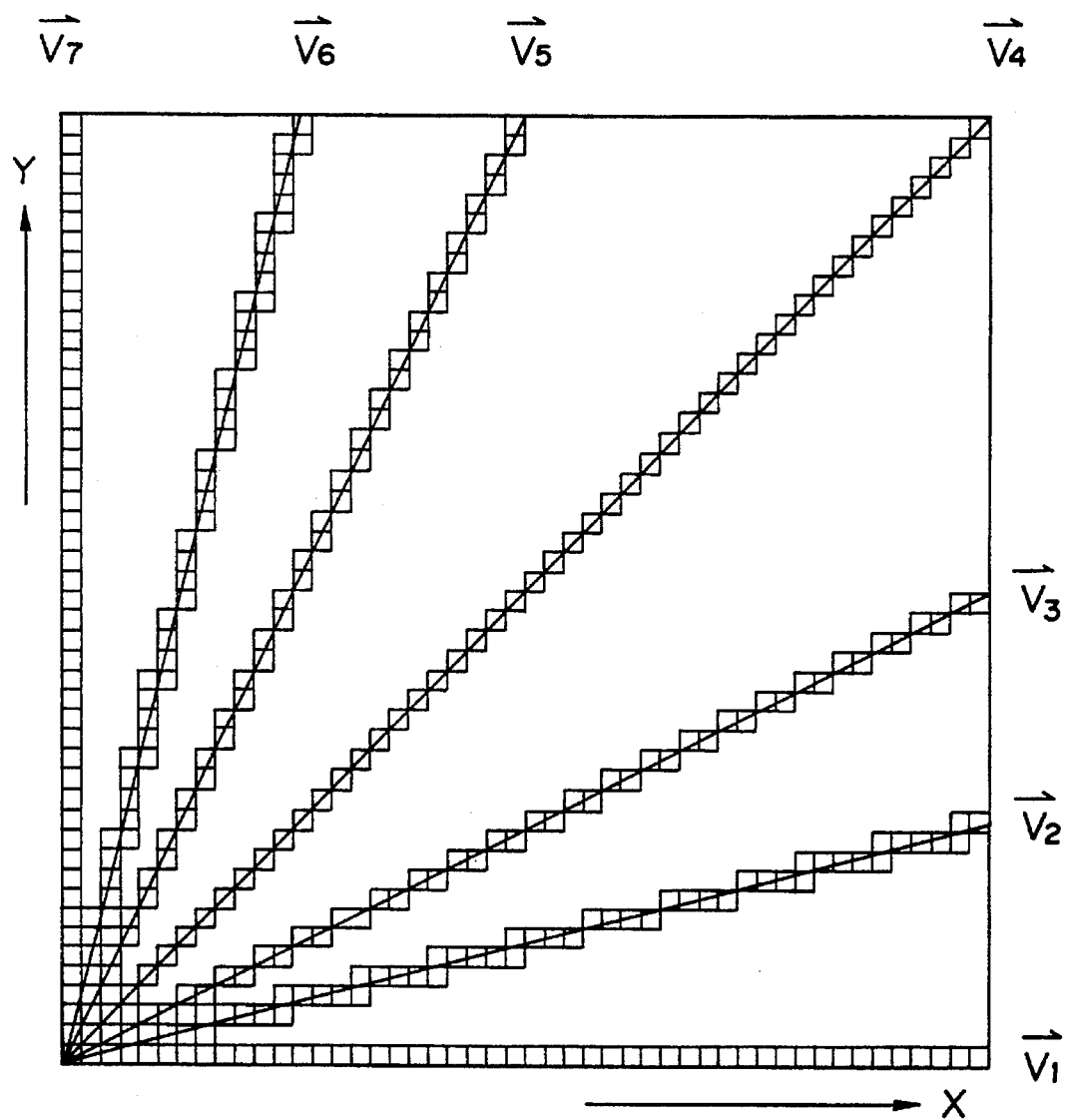
FIG. 3 is a diagram illustrating a process for symbolizing an input stroke.
Figure 4:
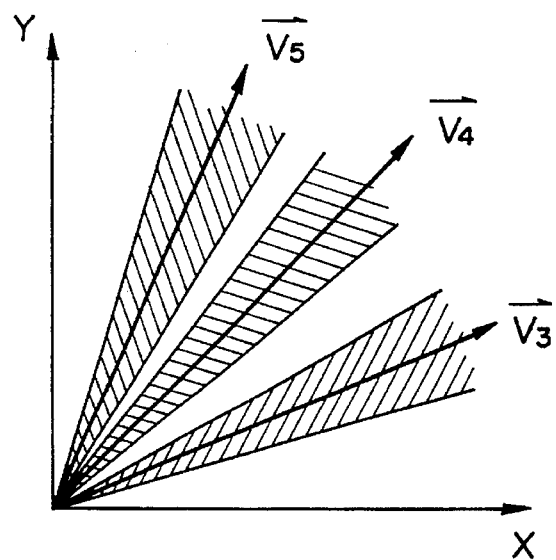
FIG. 4 is another diagram illustrating the process for symbolizing the input stroke.

FIG. 3 shows an example of a pattern of a straight line drawn on the tablet. In FIG. 3, $V_1$–$V_7$ respectively denote straight lines drawn by detected patterns, and the minimum unit for detection on the tablet is shown by "□". In this case, the vectors $V_1$– $V_7$ are described under the following conditions 1)–4).

1) The horizontal axis is the X axis, and the vertical axis is the Y axis.

2) A symbol "r" denotes that more than three consecutive detection units are detected when the detection position of an input pen or a finger on the tablet continuously moves in the X-axis direction (a change in the X coordinate). A symbol "q" denotes that two or three consecutive detection units are detected at that time, and a symbol "p" denotes that one detection unit is detected at that time.

3) A symbol "u" denotes that more than three consecutive detection units are detected when the detection position of an input pen or a finger on the tablet continuously moves in the Y-axis direction (a change in the Y coordinate). A symbol "v" denotes that two or three consecutive detection units are detected at that time, and a symbol "w" denotes that one detection unit is detected at that time.

4) A symbol "S" denotes that more than three consecutive detection units are detected when the detection position continuously moves in either the X-axis direction or the Y-axis direction while the detection position does not move in the other direction (X or Y axis direction). A symbol "s" denotes that two or three consecutive detection units are detected at that time, and a symbol "t" denotes that one direction unit detected at that time.

In the following explanation, "[symbol string]n" denotes that the "symbol string" are consecutively repeated for n times. For example, "[rt]3" denotes the same meaning as "rtrtrt".

Under the above conditions, vectors $V_1$, $V_4$ and $V_7$ can be easily described as follows.

$V_1$: X-axis direction: r

Y-axis direction: S $V_4$: X-axis direction: r

Y-axis direction: u $V_7$: X-axis direction: S

Y-axis direction: u

Further, vectors $V_2$, $V_3$, $V_5$ and $V_6$ can be described as follows.

$V_2$: X-axis direction: [rt]7p

Y-axis direction [Sw]6 [sw]4 [Sw]2t $V_3$: X-axis direction: r

Y-axis direction: s[wt]23

$V_5$: X-axis direction: s[pt]23

Y-axis direction: u $V_6$: X-axis direction: [Sp]6 [sp]4 [Sp]2t

Y-axis direction: [ut]7w

Out of the above-mentioned four vectors $V_2$, $V_3$, $V_5$ and $V_6$, vectors $V_2$ and $V_6$ have the same variation by interchanging the X-axis direction and the Y-axis direction with each other, and vectors $V_3$ and $V_5$ have the same variation by interchanging the X-axis direction and the Y-axis direction with each other. With the above in mind, simplification of symbol strings will be described below with respect to the vectors $V_2$ and $V_3$.

i) Vector $V_2$:

The vector $V_2$ includes seven consecutive symbol strings "rt" except for the last symbol "p" in the X-axis direction. By paying attention to symbol "t", the symbols of the vector $V_2$ in the X-axis direction are regrouped on the basis of the symbols located before and after the symbol "t". All symbols located before and after the symbol "t" are "r". When the symbol "t" is regarded as the symbol "w" and the symbol string "rw" is regarded as the symbol "r", the symbol string of the vector $V_2$ in the X-axis direction can be simplified as follows:

X-axis direction: r[r]6p

Generally, the leading and trailing portions of the input stroke do not reflect features of the input stroke, and can be omitted. Hence, the symbol string of the vector $V_2$ in the X-axis direction can be further simplified as follows:

X-axis direction: r

In addition, the symbol string of the vector $V_2$ in the X-axis direction can be simplified as follows by regarding the symbol "w" as the symbol "t":

Y-axis direction: S

In this case, as seen from FIG. 3, the symbol "S" means an upward movement.

In the same manner as described above, the vector $V_6$ can be simply described by simplifying symbol strings in the X-axis and Y-axis directions. The description of the vectors $V_2$ and $V_6$ becomes as follows:

$V_2$: X-axis direction: r

Y-axis direction: S $V_6$: X-axis direction: S

Y-axis direction: u ii) Vector $V_3$:

With respect to the vector $V_3$, it is not necessary to simplify the symbol string of the vector $V_3$ in the X-axis direction because the symbol string of the vector $V_3$ in the X-axis direction is described by one symbol. Hence, the symbol string of the vector $V_3$ in the Y-axis direction is simplified as follows.

In the Y-axis direction, 23 symbol strings "wt" are repeated except for the first symbol "s". By paying attention to the symbol "t", the symbols of the vector $V_3$ in the Y-axis direction are regrouped on the basis of the symbols located before and after the symbol "t" in the same manner as those of the vector $V_2$. In this case, all symbols before and after the symbol "t" are "w". Hence, the symbol "t" is regarded as the symbol "w", and the symbol string "ww" is regarded as the symbol "v". Thus, the symbol string of the vector $V_3$ in the Y-axis direction can be described as follows:

Y-axis direction: s[v]21vwt

Further, the leading and trailing portions of the input stroke do not reflect features of the input stroke, and can be omitted. Hence, the symbol string of the vector $V_3$ in the Y-axis direction can be further simplified as follows:

Y-axis direction: v

In this case, as seen from FIG. 3, the symbol "v" means an upward movement a little steeper than that of the symbol "r" which corresponds to the vector $V_2$.

In the same manner as described above, the symbol string of the vector $V_5$ in the X-axis direction is simplified as follows:

X-axis direction: q

Hence, the final descriptions of the vectors $V_3$ and $V_5$ are as follows:

$V_3$: X-axis direction: r

Y-axis direction: v $V_5$: X-axis direction: q

Y-axis direction: u

If a vectors is expressed in a manner of "(X-axis direction, Y-axis direction)", the vectors $V_1$ and $V_2$ are expressed by the same description (r, S), and the vectors $V_7$ and $V_6$ are expressed as the same description (S, u), although the straight lines actually inputted on the tablet are different from each other, as shown in FIG. 3. This means that the descriptions (r, S) and (S, u) indicate vectors included in a certain area. That is, the descriptions (r, v), (r, u) and (q, u) of the vectors $V_3$, $V_4$ and $V_5$ do not specify the vectors $V_3$, $V_4$ and $V_5$, but indicate vectors in areas respectively having a certain width from the vectors $V_3$, $V_4$ and $V_5$. If the areas are wide, these areas may cross each other. For example, the areas of the descriptions (r, v) and (r, u) may cross each other. If the areas are narrow, a transition area will be present. It is difficult and meaningless to identify areas specified by the descriptions (equivalent to the symbol strings) because there are various situations. Hence, correlation coefficients between symbols obtained beforehand by experiments are introduced. The aforementioned descriptions (r, v) and (r, u) will now be studied. It will now be assumed that the correlation coefficient between the symbols "v" and "u" is 0.8, and the correlation coefficient between the symbols "r" and "r" is 1. The vector $V_4$=(r, u) and the input stroke=(r, v) have a correlation coefficient expressed as (1, 0.8), and the vector $V_4$=(r, u) and the input stroke (r, u) have a correlation coefficient (1, 1). Hence, the input stroke= (r, u) is same as the vector $V_4$, and it is concluded that the input stroke= (r, v) is close to the vector $V_4$.

The features of the input handwritten character obtained from the input strokes have a redundancy, and it cannot be necessarily concluded that the vector $V_4$ is completely different from the vector $V_5$. Hence, the reference strokes and the input strokes are described using the symbols and the symbol strings having the correlation coefficients. Then, the degree of match between the symbol string describing the reference stroke and the symbol string describing the input stroke is studied. This process is substantially immune to deformation of the input stroke.

As described above, according to the symbolizing method of the present embodiment, the grouping process for the symbol strings is performed on the basis of the symbol indicating the movement direction of the detection position (center point) and an area in which the consecutive same symbols are present. Further, the regrouping process is performed on the basis of the obtained groups, so that the input stroke can described by a minimized number of symbol strings.

Furthermore, the symbolizing process in the X-axis direction is carried out independently of the symbolizing process in the Y-axis direction. Hence, it is not necessary to strictly select the sampling intervals for the input stroke and it becomes possible to easily describe the input stroke by a minimum number of symbol strings.

A description will now be given, with reference to FIGS. 5 through 8, of the more general concept of the symbol redefinition based on the grouping and regrouping processes.

Figure 5:
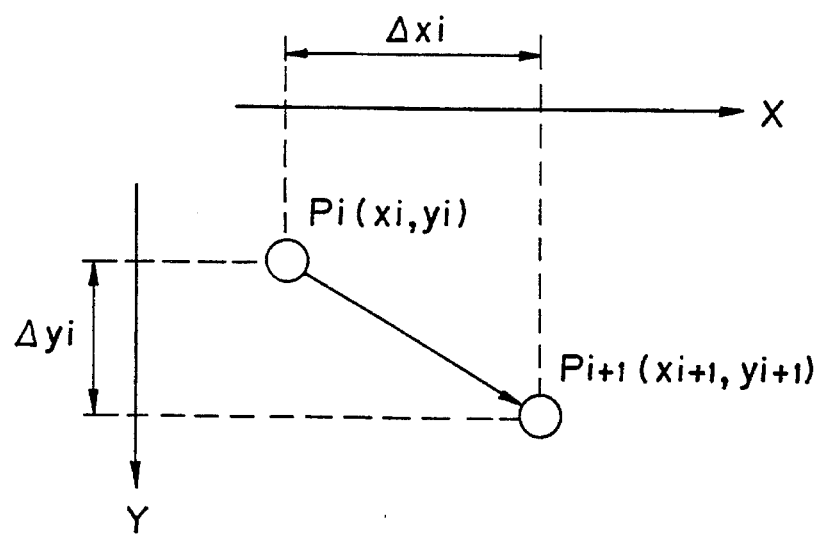
FIG. 5 is a diagram illustrating a process for redefining symbols.

Referring to FIG. 5, when the detection position (center point) moves, a difference $\Delta x_i$ between two points in the X direction and a difference $\Delta y_i$ between the two points in the Y direction are respectively expressed as follows:

$$\Delta x_i = x_{i+1} - x_i$$

$$\Delta y_i = y_{i+1} - y_i$$

Then, the differences $\Delta x_i$ and $\Delta y_i$ are respectively accumulated until the signs of the differences are respectively inverted or the differences respectively become zero. For example, if $$\Delta x_0 = 3, \Delta x_1 = 2 \text{ and } \Delta x_2 = -1,$$
$$|dx| = 3 + 2$$
$$= 5$$

If $\Delta y_0 = -2, \Delta y_1 = -1$ and $\Delta y_2 = -3,$
$$|dy| = |(-2) + (-1) + (-3)|$$
$$= 6$$

When the difference $\Delta x_i = 0$ successively appears, the difference $\Delta y_i$ is accumulated during that period. When the difference $\Delta y_i = 0$ successively appears, the difference $\Delta x_i$ is accumulated during that period.

The group is categorized in either one of the following three groups on the basis of the values of the sums $|dx|$ and $|dy|$ obtained in the above manner.

i) gl group: $\alpha \leq |dx|, |dy|$
  N: sign (−)
  P: sign (+)
  Z: 0
ii) gm group $1 \leq |dx|, |dy| < \alpha$
  M: sign (−)
  O: sign (+)
  Y: 0
iii) gs group: $|dx|, |dy| = 1$
  L: sign (−)
  Q: sign (+)
  X: 0

In the above cases, $\alpha$ is a threshold value obtained by the experiments. The explanation with reference to FIG. 3 uses the threshold value $\alpha = 4$. FIGS. 6 and 7 show regrouping rules with respect to the gl group and the gm group. In these figures, symbols in a rectangular block are investigation symbols to be noticed, and a blank space indicates the trailing end of the corresponding symbol string. The investigation symbol located before the blank space indicates the leading end of the symbol string. A bar attached above the symbol string indicates symbols other than the symbols to which the bar is attached. The regrouping process is carried out for the gm group and the gs group so that the final symbol strings belong to only the gl group and the gm group.

The rule of the regrouping process will be described with reference to FIG. 7. In an upper portion in FIG. 7, in a case where the symbols located before and after the investigation symbol are "Z" and the investigation symbol is other than the symbol "O", the investigation symbol is changed to "Z". The symbols located before and after the investigation symbol with respect to the other symbols "Q" and "X" are changed in almost the same manner as shown in FIGS. 6 and 7.

Figure 8:
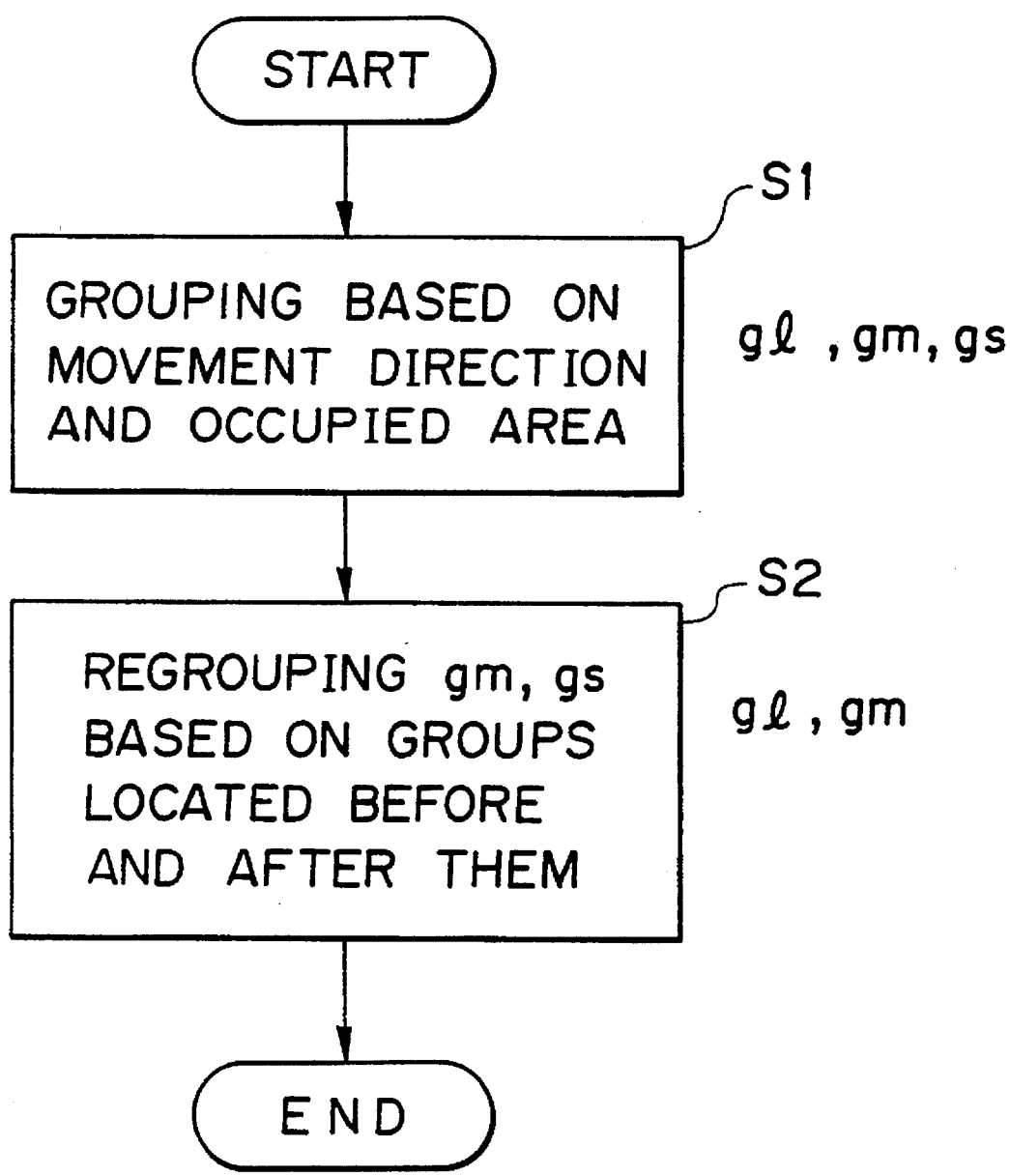
FIG. 8 is a flowchart of a symbol redefinition process.

In short, as shown in FIG. 8, a symbol redefinition process starts with the grouping process based on the movement direction and the occupied area in step S1 so that the three groups gl, gm and gs are generated. Hence, the input stroke can be described by each symbol string belonging to the groups gl, gm and gs.

The groups gm and gs are redefined using the redefinition rules, and the input stroke is described by the symbol string belonging to the two groups gl and gm.

In the above manner, the input stroke can be described by a minimum number of symbol strings.

Figure 9:
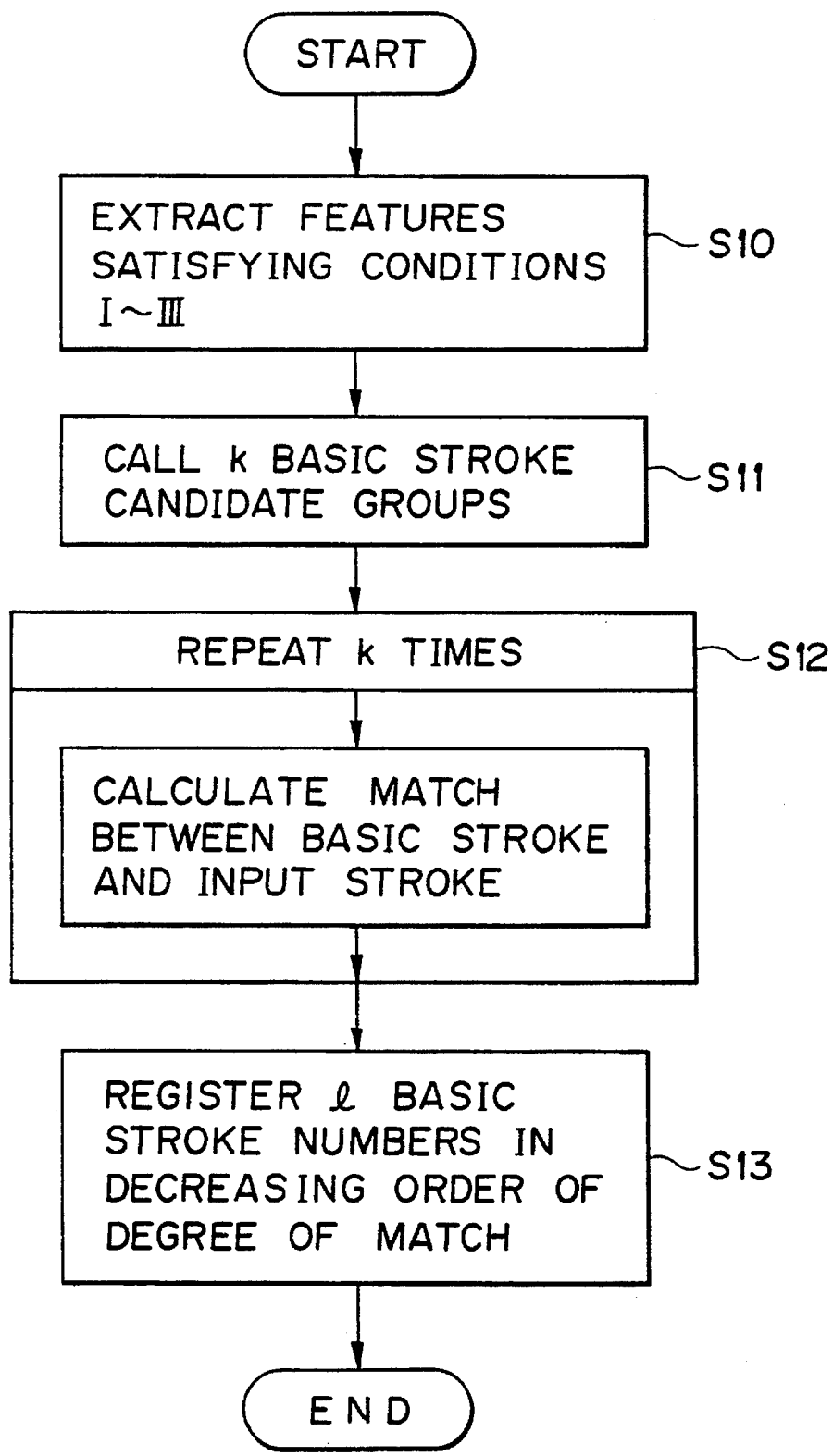
FIG. 9 is a flowchart of a stroke identification process.
Figure 10:
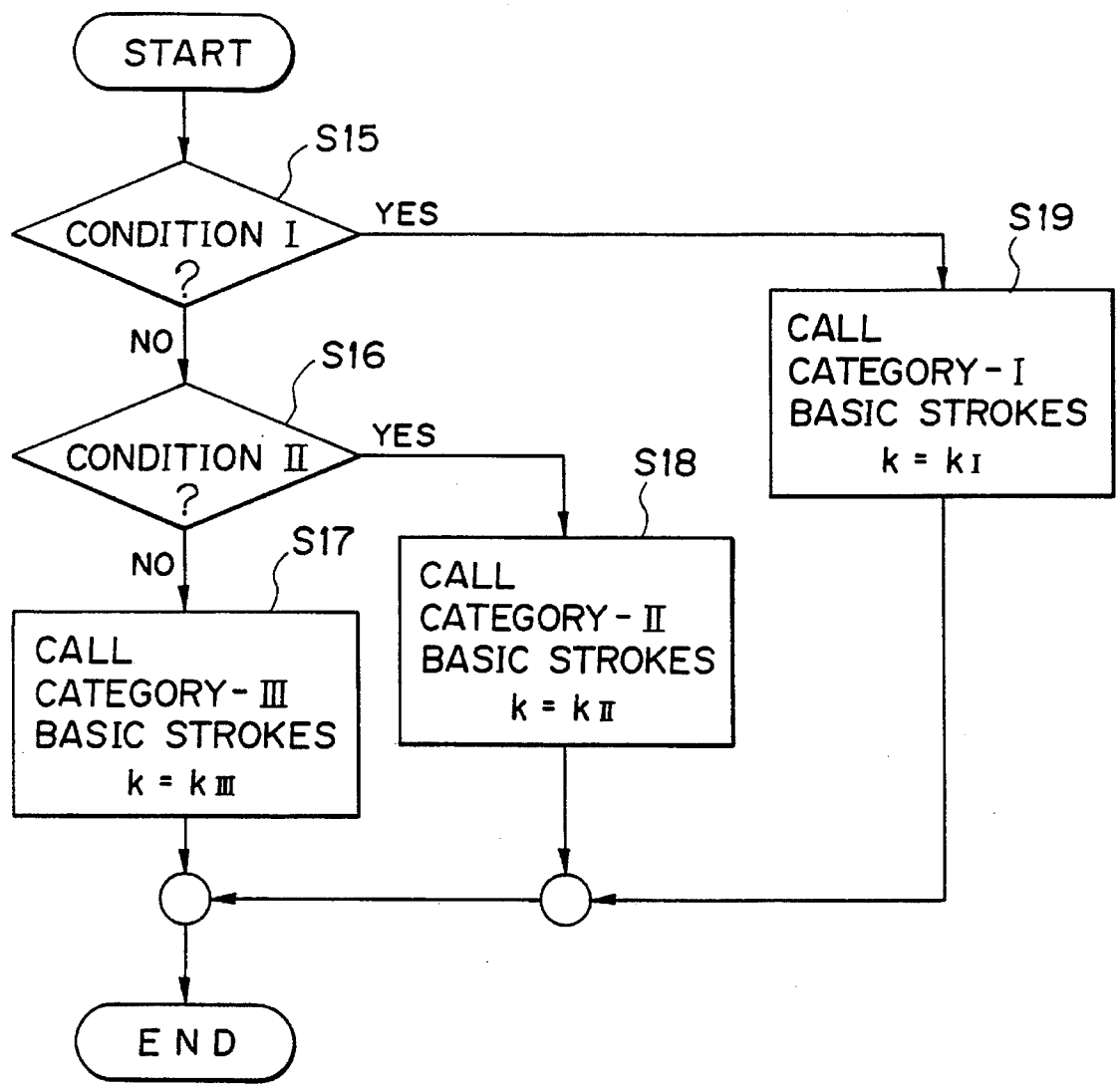
FIG. 10 is another flowchart of the stroke identification process.

Next, a description will now be given, with reference to FIGS. 9 through 11, of a stroke identification process.

Now, the following three basic stroke extraction conditions are defined.

Figure 11:
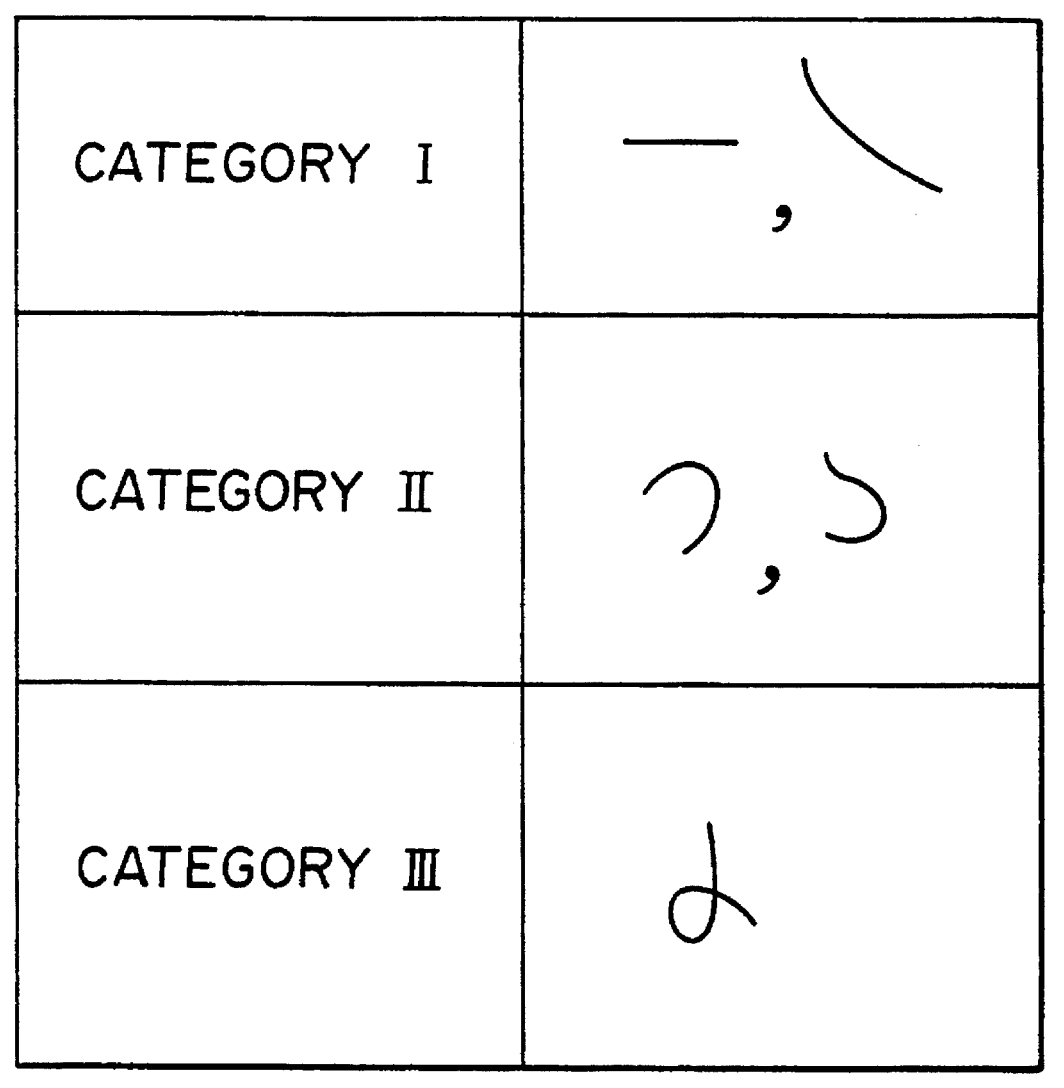

Condition I: the movement direction does not reverse (this is defined as category I, and the examples thereof are shown in FIG. 11).

Condition II: the movement direction reverses but there is no cross point (this is defined as category II, and the examples thereof are shown in FIG. 11).

Condition III: the movement direction reverses and there is a cross point (this is defined as category III, and the examples thereof are shown in FIG. 11).

In operation, first of all, a feature satisfying one of the above three conditions is extracted from an input stroke in step S10.

Next, a group of k basic strokes that function as candidates is called in step S11. More specifically, it is determined whether or not the extracted feature satisfies the condition I in step S15. When the extracted feature satisfies the condition I, k ($=k_I$) basic strokes belonging to the category I are called in step S19.

When the extracted feature does not satisfy the condition I, it is determined whether or not the extracted feature satisfies the condition II in step S16. When the extracted feature satisfies the condition II, k ($=k_{II}$) basic strokes belonging to the category II are called in step S18.

When the extracted feature does not satisfy the condition II, k ($=k_{III}$) basic strokes belonging to the category III are called in step S17.

Subsequently, a match between each of the k called basic strokes and the input stroke is calculated in step S12 (the details thereof will be described later). Then, l basic stroke numbers are registered in the decreasing order of the degree of match from the highest degree of match in step S13.

Figure 12:
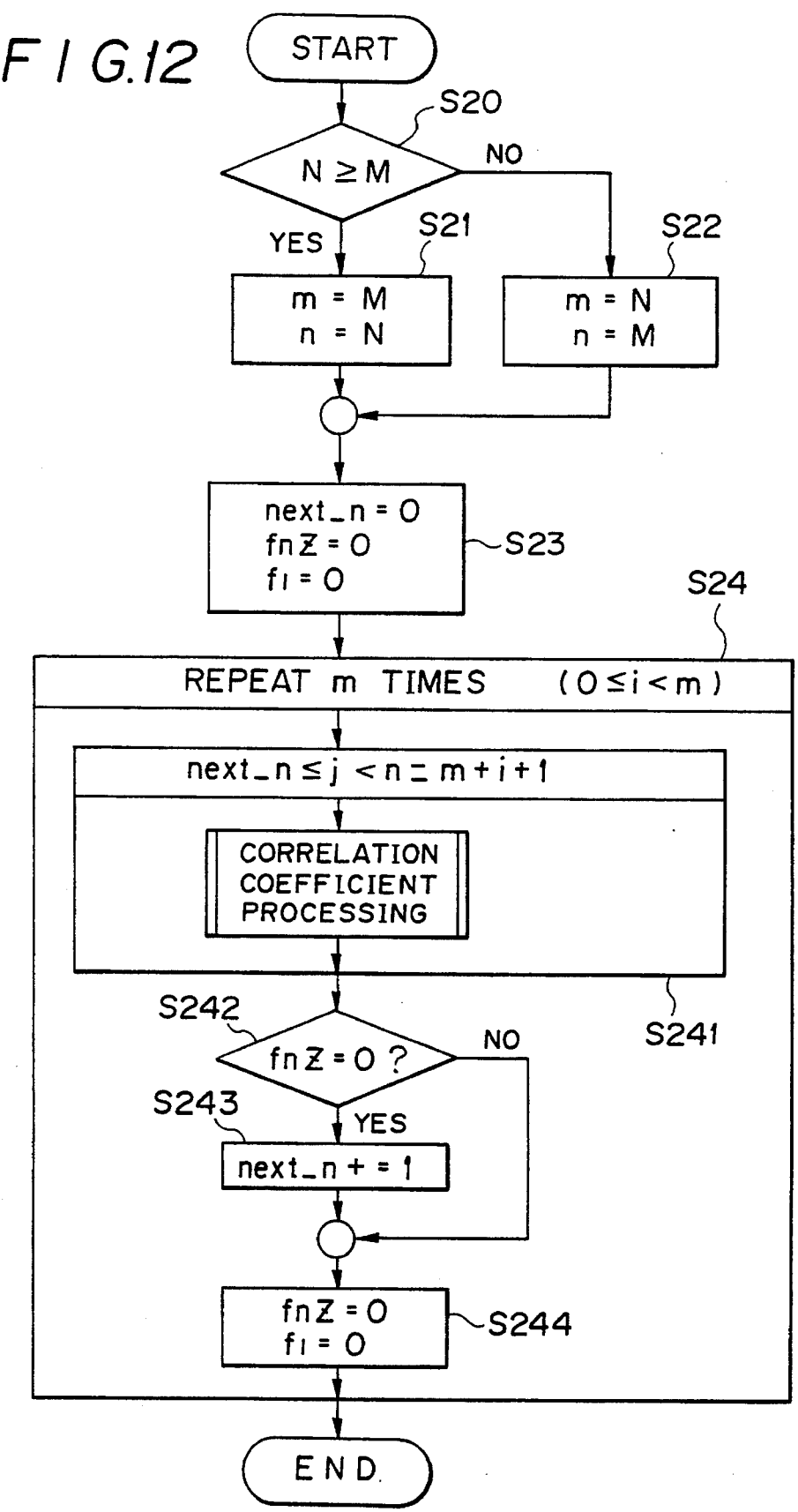
FIG. 12 is a flowchart of a degree-of-match computation process.
Figure 13:
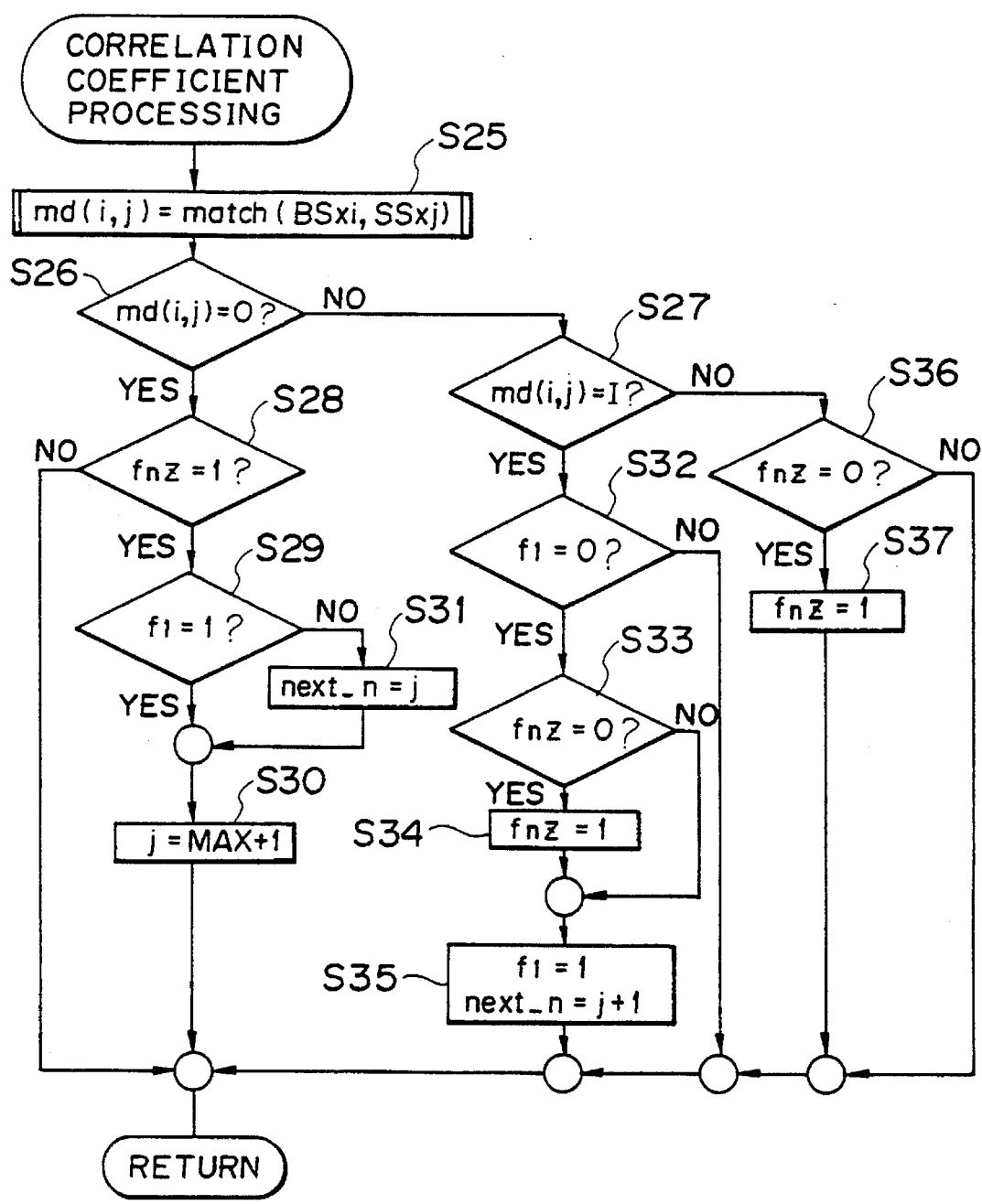
FIG. 13 is a flowchart of a correlation coefficient process.

A description will now be given, with reference to FIGS. 12 through 14, of a process for calculating the degree of match between the basic strokes and the input stroke. In the present embodiment, one correlation coefficient is defined between two strokes described by two symbols. The value of the correlation coefficient corresponds to the degree of match between the two strokes, and the greatest value is obtained when both the strokes are the same as each other. Then, the correlation coefficient between the symbol string forming the input stroke and the symbol stroke forming the basic stroke is obtained. The degree of match becomes high when the average of the values of the correlation coefficients is high.

First, the process for calculating the degree of match is initialized in steps S20–S23. In the initializing process, the following parameters are defined:

N: number of symbols in the input stroke symbol string

M: number of symbols in the basic stroke symbol string next$_{13}$ n, m, n: variable for a loop process fnz: a flag indicating whether or not the correlation coefficient is zero $f_1$: a flag indicating whether or not the correlation coefficient is 1.

In the following description, the process related to the X-axis direction in which $N \geq M$ will be explained because the same process is carried out in the X-axis and Y-axis directions.

The process performed in step S24 is to obtain the correlation coefficients between the input stroke symbol string and a minimum number of basic stroke symbol strings selected in order to reduce the operation time in step S241.

Next, it is determined whether or not the variable fnz is equal to zero step S242. When the variable fnz is equal to zero, 1 is added to the loop variable next$_{13}$ n, and the variables fnz and $f_1$ are set to zero in step S243.

When the variable fnz is not equal to zero, the variables fnz and $f_1$ are set to zero in step S245.

In the process of step S241, by using, as variables, one symbol SSxJ forming the input stroke and one symbol BSxj forming the basic stroke, the correlation coefficient between these symbols is calculated using a function "match", and the result of the operation is stored in an arrangement variable md(i, j) in step S25.

Next, the value of the correlation coefficient obtained in the above process is identified in steps S26 and S27. Then, one of the following three processes is performed in accordance with the value of the correlation coefficient. More particularly, the first process consisting of steps S28– S30 is carried out when the value of the correlation coefficient is zero. The second process consisting of steps S32–S35) is carried out when the value of the correlation coefficient is 1. The third process consisting of steps S36–S37 is carried out when the value of the correlation coefficient is greater than 0 and less than 1.

Lists of the of the correlation coefficients thus calculated are illustrated in FIGS. 14A through 14D. A description will mainly be given of FIG. 12A for the sake of simplicity. FIG. 14A shows the list of the correlation coefficients in the X-axis direction with respect to basic stroke number 57. In FIG. 14A, the symbol string (m, n, m, y, o, p, o, y, m) in the horizontal direction is the symbol string of an input stroke, and the symbol string (m, n, y, p, y) in the vertical direction is the symbol string of a basic stroke. The symbols m, n, o, p, y and z respectively have the following meanings:

m: smooth upward (or rightward) movement n: upward (or rightward) movement o: smooth downward (or leftward) movement p: downward (leftward) movement y: short stop z: stop The numerical values enclosed by ovals are data of the correlation coefficients. Mx ($0 \leq Mx \leq 1$) in the X-axis direction is data indicating the degree of match. As the value of the Mx increases, the degree of match increases. ". . . " indicates a part in which the calculation is omitted.

Similarly, My is data indicating the degree of match in the Y-axis direction.

The degree of match shown in FIGS. 14A and 14B will be evaluated as follows.

Reference stroke number 57: Mx=0.91, My=0.90.

Reference stroke number 49: Mx=0.36, My=0.52.

When the above basic strokes are compared with each other, the data Mx and My of basic stroke number 57 are higher than those of basic stroke number 49. Hence, the input stroke is closer (more similar) to basic stroke number 57 than basic stroke number 49.

[II] Structure of the Embodiment

A description will now be given, with reference to FIGS. 15 through 26, of the structure of the embodiment of the present invention.

An on-line handwritten character recognition device 1 includes a tablet 2, a recognition device 3, a display device 4, and an output device 5. The tablet 2 generates stroke data of handwritten characters input by the user. The recognition device 3 executes a character recognition process using the stroke data. The display device 4 displays the result of the character recognition. The output device 5 prints the result of the character recognition.

The structure of the tablet 2 will be described with reference to FIGS. 16 through 22.

Figure 16:
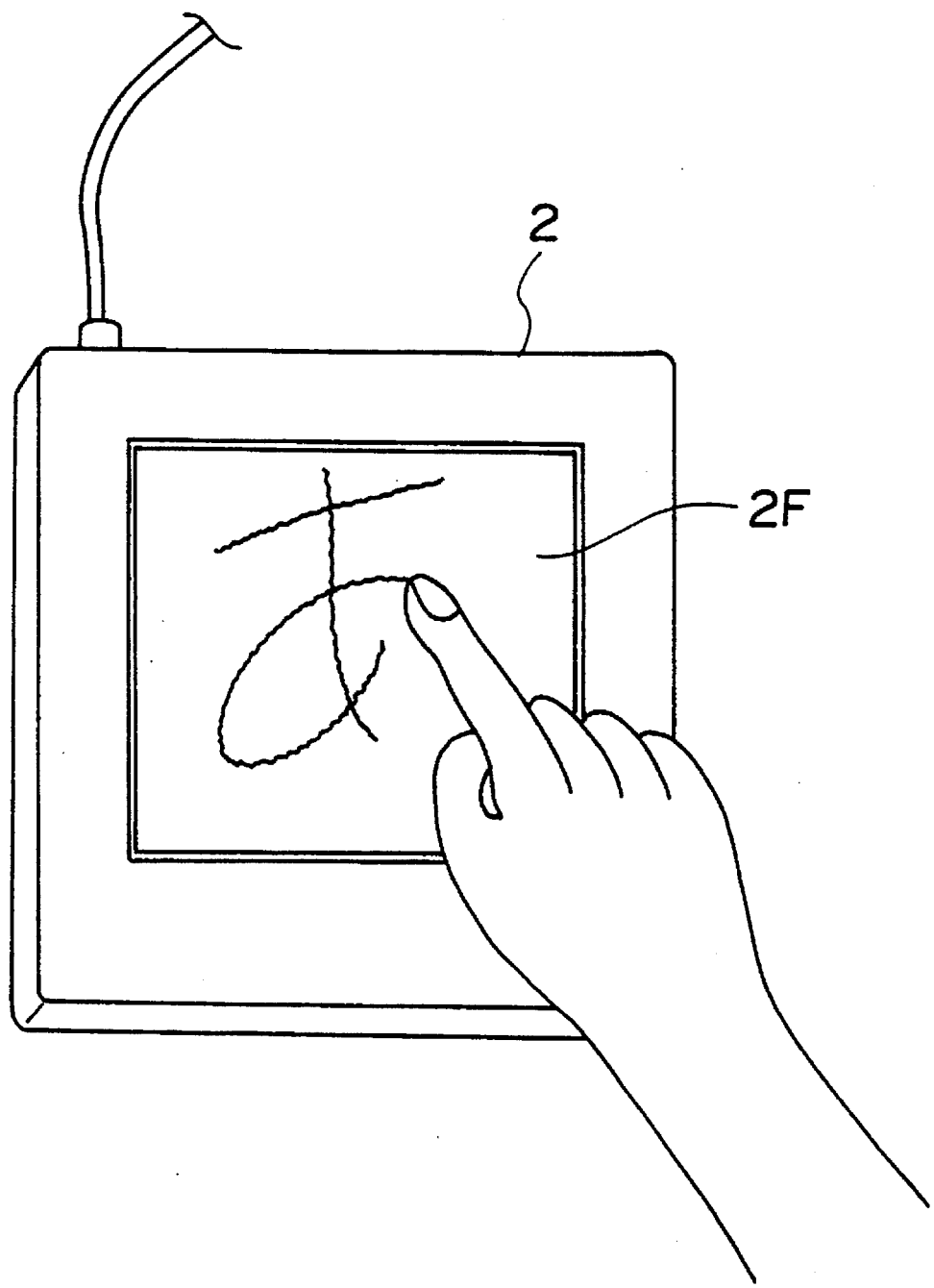
FIG. 16 is a diagram illustrating how an operation of a tablet.

FIG. 16 shows how the tablet 2 is used. The tablet 2 used in the embodiment is of a skin resistance detection type. A character is inputted to the device by directly sliding a finger on an input plane 2F of the tablet 2. As shown in FIG. 17A, touch plates arranged in the X and Y directions are provided on the input plane 2F. The arrangement of touch plates has a detection resolution equal to 24×24 dots, for example.

In FIG. 17A, a block illustrated by a broken line denotes an area with which the finger is in touch, and blank and filled circles ("○", "●") denote touch plates. In the following description, an input character is detected by segmenting it into areas, each consisting of 24×24 dots.

Input signals $Y_{10a}$, $Y_{11a}$, $Y_{12a}$ and $Y_{13a}$ respectively shown in FIGS. 17B, 17C, 17D and 17E are applied to the touch plates (indicated by filled circles "●") arranged in the Y direction through diodes $D_{10a}$, $D_{11a}$, $D_{12a}$ and $D_{13a}$ shown in FIG. 17F are applied to the touch plates arranged in the Y direction through diodes $D_{10b}$–$D_{13b}$. The signals $Y_{10b}$–$Y_{13b}$ are inverted signals of a basic clock signal shown in FIG. 18, and are used to discharge a stray capacitance of the finger of the user and other capacitances, so that the falling edges of output signals $x_{15}$–$x_{18}$ shown in FIG. 17G are made sharp, as shown by the broken line in FIG. 19A. If the signals $Y_{10b}$–$Y_{13b}$ are not applied to the touch plates arranged in the Y direction, a latch pulse signal A out of the output signals is not a pulse train, as shown by the solid line in FIG. 19B, and only a signal $Y_{10}$ shown in FIG. 19C is latched. Signals $Y_{11}$–$Y_{13}$ shown in FIGS. 19D–19F are not latched.

Figure 20:
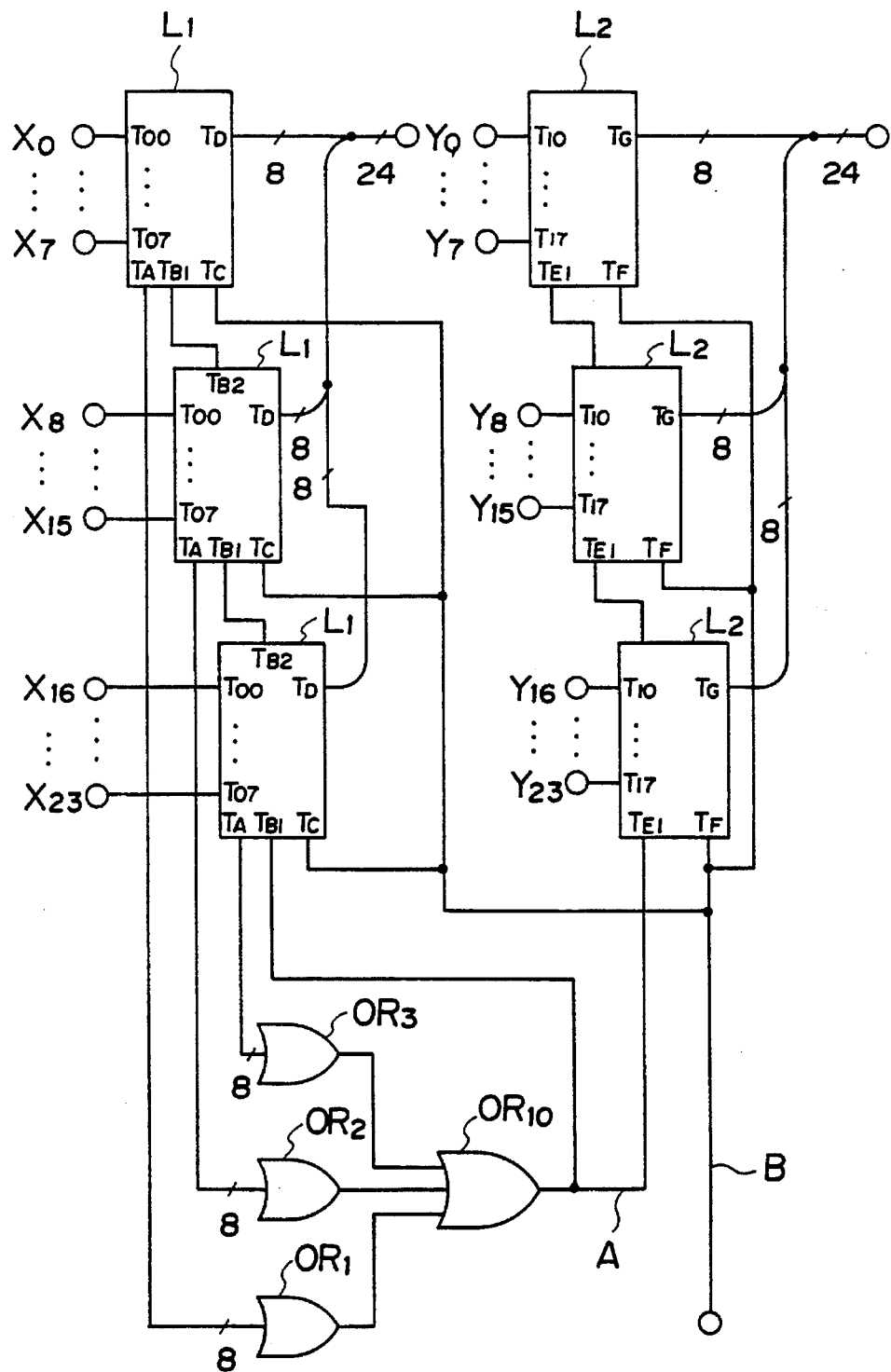
FIG. 20 is a block diagram showing an overview of the detection circuit.
Figure 21:
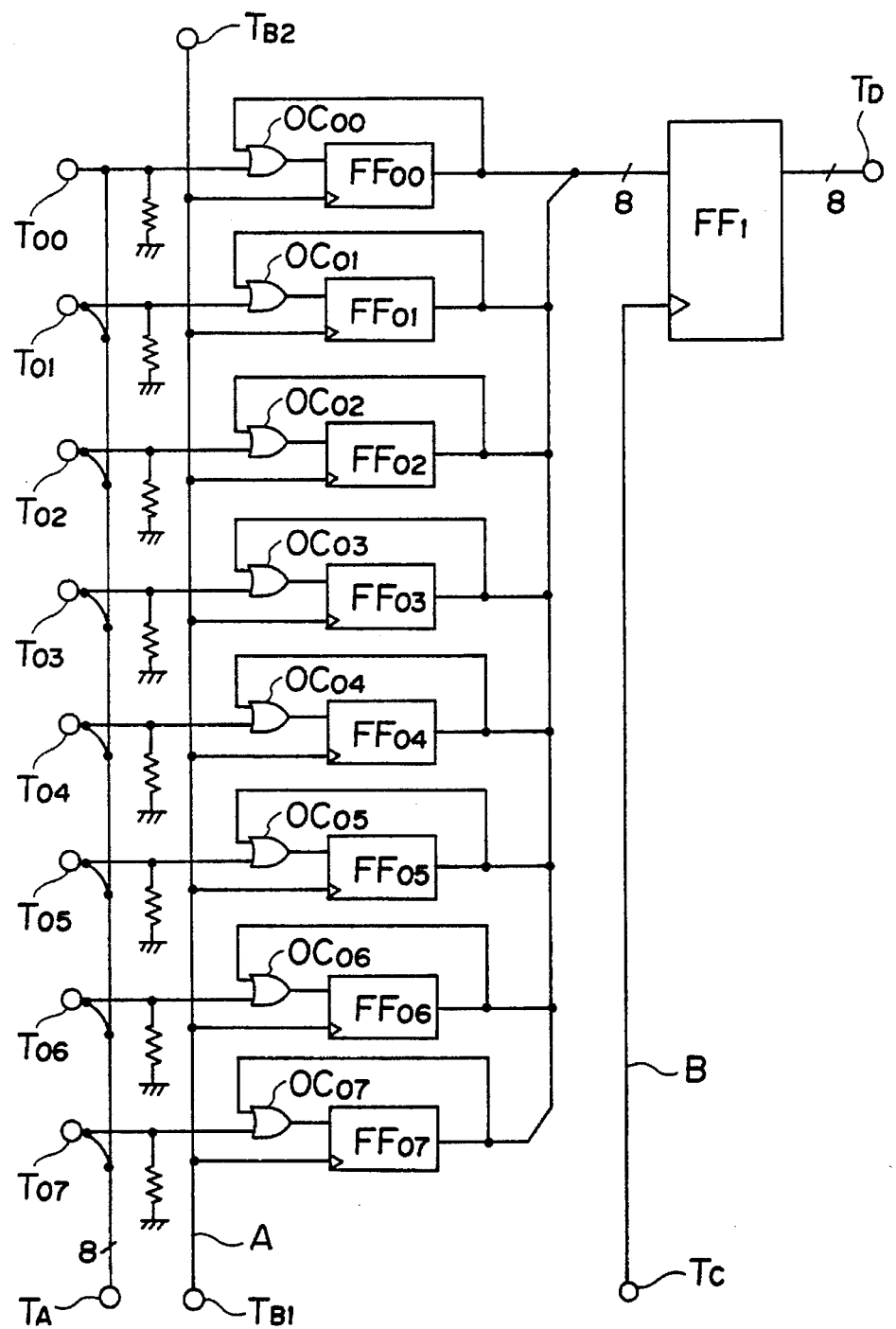
FIG. 21 is a block diagram illustrating the detection circuit in detail.
Figure 22:
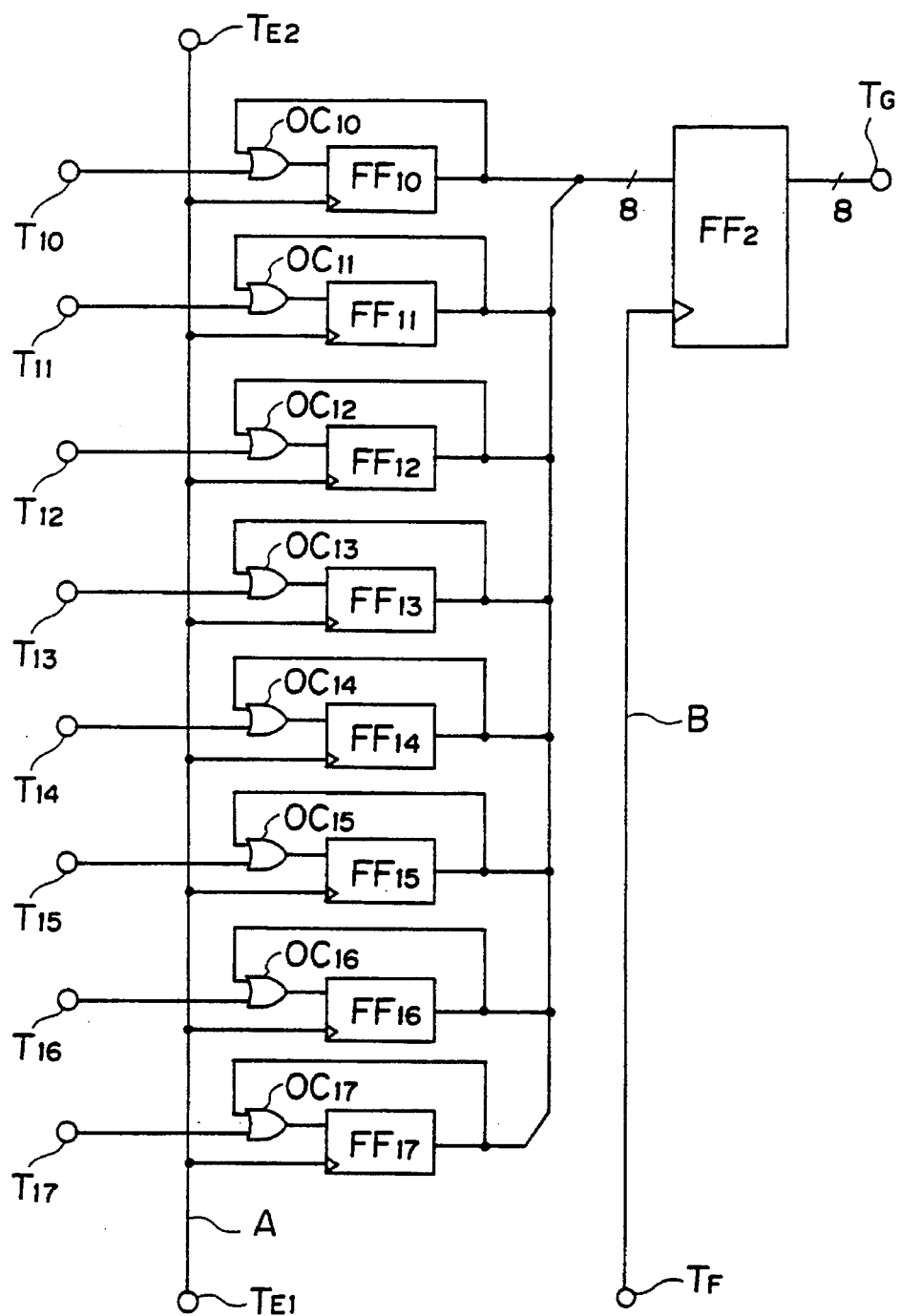
FIG. 22 is another block diagram illustrating the detection circuit in detail.

FIGS. 20 through 22 show the structure of a detection circuit.

In actuality, pulses are transferred to the touch plates (indicated by blank circles "○") arranged in the X direction through a resistance of the finger of the user, and signals $X_{15}$–$X_{18}$ shown in FIG. 17G are outputted. These signals $X_{15}$–$X_{18}$ are applied to an OR circuit $OR_2$ or an OR circuit $OR_3$ and an OR circuit $OR_{10}$, whereby the latch pulse signal A is generated. In synchronism with the latch pulse signal A, the signals $X_{15}$–$X_{18}$ are held as X-direction data, and signals $Y_{10}$–$Y_{13}$ are held as Y-direction data. Thereafter, these signals are cleared by a clear signal C shown in FIG. 18. When signals $X_0$–$X_7$ are inputted, the latch pulse signal A is generated by the OR circuit $OR_1$ and the OR circuit $OR_{10}$.

Signals $X_i$ (i=1–23) and $Y_i$ (=1–23) are latched by D-type flip flops $FF_{00}$–$FF_{07}$ and $FF_{10}$–$FF_{17}$ via corresponding OR circuits $OC_{00}$–$OC_{07}$ and $OC_{10}$–$OC_{17}$ in synchronism with the latch pulse signal A. Thereafter, the signals $X_i$ and $Y_i$ are held and hence updated in D-type flip flops $FF_1$ and $FF_2$ in synchronism with a hold signal B. More particularly, the hold signal B is generated with a period 32 times the period of the basic clock signal shown in FIG. 18, and is used to update the held data.

In the processing apparatus, a logic AND operation on an inverted signal XB of the hold signal B, a signal Xtn (X00 U X01 U . . . U X22 U X23) and a signal Ytn (Y00 U Y01 U . . . U Y22 U Y23) is carried out, and an AND signal is generated. This AND signal is used as a data latch starting signal, and data is latched in synchronism with the data latch starting signal in order to, for example, display the latched data.

A description will now be given, with reference to FIGS. 23A and 23B, of a concrete example of the process for symbolizing the input stroke. In the explanation given below, the following three symbols are used with respect to the movement in the X direction:

R: rightward movement, L: leftward movement, S: no movement (stop), and the following three symbols are used with respect to the movement in the Y direction:

U: upward movement, D: downward movement, S: no movement (stop).

Two arbitrary symbols among the above-mentioned symbols used to extract basic strokes have correlation coefficients shown in FIGS. 23A and 23B. The relation among correlation coefficients $\omega_0$, $\omega_1$ and $\omega_2$ are, for example, as follows:

$$\omega_0 (=1) > \omega_1 > \omega_2 (=0)$$

As described above, the symbols used to extract the basic strokes have respective redundancy by introducing the correction coefficients into computation for the degree of match. It is sufficient to use a single basic stroke extraction symbol for the basic stroke corresponding to a specific stroke.

Figure 24A:
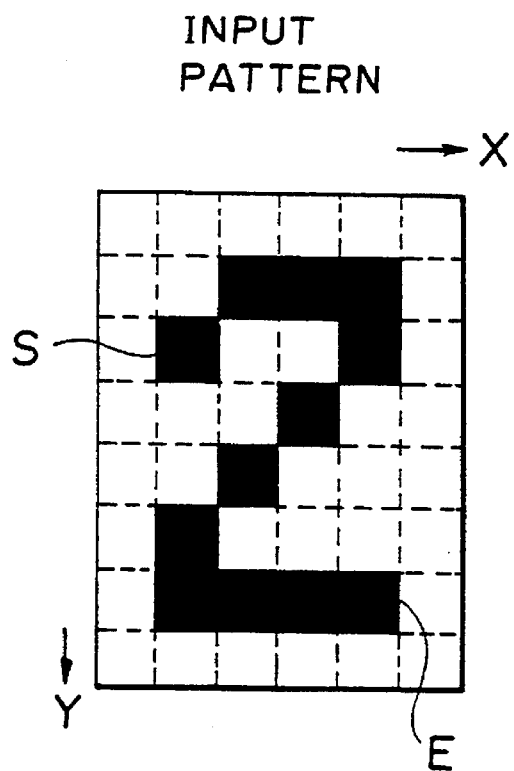
FIGS. 24A and 24B are diagrams illustrating a matching process for an input pattern.

FIG. 24A shows an input pattern having a starting point S and an end point E. In this case, the movement of the input pattern in the X direction is as follows:

rightward—no movement—leftward—no movement—rightward and the corresponding basic stroke extraction symbols are as follows:

R—S—L—S—R

Similarly, the movement of the input pattern in the Y direction is as follows:

upward—no movement—downward—no movement and the corresponding basic stroke extraction symbols are as follows:

U—S—D—S

A description will now be given, with reference to FIG. 24, of a process for identifying the input pattern.

Figure 24B:
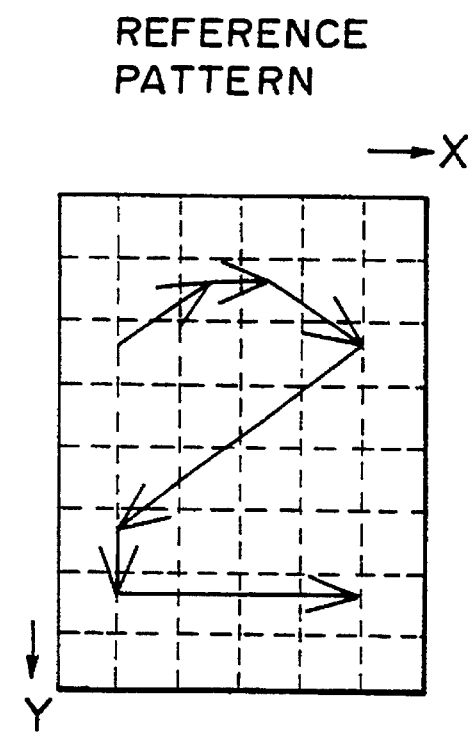

If a reference pattern image is as shown in FIG. 24B, the movement of the reference pattern in the X direction is as follows:

rightward—leftward—no movement—rightward and the corresponding basic stroke extraction symbol string is as follows:

R—L—S—R

In the same manner as described above, the movement of the reference pattern in the Y direction is as follows:

upward—no movement—downward—no movement and the corresponding basic stroke extraction symbol string is as follows:

U—S—D—S

The above two symbol strings are compared with each other for each symbol (see FIG. 25).

As shown in FIGS. 23A and 23B, the correlation coefficient is obtained by comparing the first symbol "R" of the basic stroke extraction symbol string corresponding to the reference pattern with the first symbol "R" of the basic stroke extraction symbol string corresponding to the input pattern. In this case, the first symbols are the same as each other, and the correlation coefficient is $\omega_0$. In this case, adjacent symbols among the symbols forming the basic stroke extraction symbol string are different from each other. Hence, when the correlation coefficient is $\omega_0$, the subsequent comparing operation is not carried out for the reference pattern being considered. Then, the comparison operation on the next symbols is performed.

Next, the correlation coefficient is obtained by comparing the second symbol "L" of the basic stroke extraction symbol string corresponding to the reference pattern with the second symbol "S" of the basic stroke extraction symbol string corresponding to the input pattern. In this case, the correlation coefficient is $\omega_1$. Therefore, the second symbol "L" of the basic stroke extraction symbol string corresponding to the reference pattern is compared with the third symbol "L" of the basic stroke extraction symbol string corresponding to the input pattern. In this case, the two symbols are the same as each other, and hence the correlation coefficient is $\omega_0$. Then, the next symbols are compared with each other.

The third symbol "S" of the basic stroke extraction symbol string corresponding to the reference pattern is compared with the fourth symbol "S" of the basic stroke extraction symbol string corresponding to the input pattern. In this case, the two symbols are the same as each other, and hence the correlation coefficient is $\omega_0$. Similarly, the fourth symbol "R" of the basic stroke extraction symbol string corresponding to the reference pattern is compared with the fifth symbol "R" of the basic stroke extraction symbol string corresponding to the input pattern. In this case, the two symbols are the same as each other, and hence the correlation coefficient is $\omega_0$.

The correlation coefficients thus obtained in the above-mentioned manner are arranged in correspondence with the symbol string of the input pattern:

R-S-L-S-R $\omega_0 - \omega_1 - \omega_0 - \omega_0 - \omega_0$

When the degree $\Omega x$ of match for the X-direction movement with respect to the reference pattern compared with the input pattern is defined as the arithmetic average of the obtained correlation coefficients, the following is obtained:

$$\Omega x = (\omega_0 + \omega_1 + \omega_0 + \omega_0 + \omega_0)/(\text{number of symbol strings})$$
$$= (\omega_0 + \omega_1 + \omega_0 + \omega_0 + \omega_0)/5$$

In this case, $\Omega x < \omega_0$.

In the same manner as described above, the degree $\Omega y$ of match for the Y-direction movement with respect to the reference pattern compared with the input pattern is obtained. For the example shown in FIG. 24, $\Omega y = \omega_0$.

In the above-mentioned manner, the degrees $\Omega(x, y)$ of match with respect to all the reference patterns to be compared with the input pattern (or the reference patterns selected so that they are categorized in a large class) are obtained. Then, reference patterns having the degrees $\Omega(x, y)$ of match higher than a predetermined threshold value are selected as candidate characters with respect to the input pattern.

According to the above-mentioned embodiment, the input strokes are symbolized for the X-axis direction and the Y-axis direction. Hence, the optimal symbolizing can be performed. Further, by defining correlation coefficients between two symbols, it is possible to make the symbol strings of basic strokes to be stored in the dictionary have redundancy. Hence, the number of basic strokes corresponding to a character can be reduced, and the capacity of the dictionary to be reduced.

In the above-mentioned embodiment of the present invention, the X axis and the Y axis are perpendicular to each other. However, the present invention can be applied to cases in which the X axis and the Y axis cross each other at angles other than 90°. The arithmetic average used in the embodiment can be replaced with a weighted average obtained by weighing the correlation coefficients.

According to the present invention, handwriting of the handwritten input character is divided into parts in the X-axis direction and in the Y-axis direction crossing the X-axis direction. Then, the x-axis direction input stroke and the Y-axis direction input stroke are extracted from the parts, and features of the handwritten input character are one-dimensionally extracted. Hence, it becomes possible to easily determine the sampling intervals for feature extraction and prevent erroneous feature extraction.

Further, the concept of the correlation coefficient between two symbols is introduced into feature extraction. Hence, it is possible to make the symbol string consisting of these symbols have redundancy and reduce the number of symbol strings (one symbol string at a minimum) corresponding to the reference characters to be stored in the dictionary. Furthermore, it is possible to easily cope with deformation of input characters.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A handwritten character recognition device comprising:

an input unit for receiving thereon one or more handwritten strokes forming a character;

stroke extracting means for analyzing said handwriting in an X-axis direction and in a Y-axis direction, and extracting an X-axis direction input stroke and a Y-axis direction input stroke, said Y-axis direction being perpendicular to said X-axis direction;

symbolizing means for converting each point and each direction change of said X-axis direction input stroke into an X-axis direction symbol string and for converting each point and each direction change of said Y-axis direction input stroke into a Y-axis direction symbol string, each of said symbol strings including one or a plurality of symbols which are representative of each point and each direction change of said one or more handwritten strokes;

first storage means for storing X-axis direction basic symbol strings each including one or a plurality of symbols corresponding to X-axis direction basic symbol strokes of reference characters, and Y-axis direction basic symbol strings each including one or a plurality of symbols corresponding to Y-axis direction basic symbol strokes of the reference characters;

means for obtaining correlation coefficients between each of said X- and Y-axis direction symbol strings and said basic symbol strings;

second storage means for storing said correlation coefficients between each of said X- and Y-axis direction symbol strings and said basic symbol strings;

degree-of-match calculating means for calculating, by referring to the first storage means and the second storage means, X-axis correlation coefficients between the symbols forming the X-axis direction symbol string and the symbols forming the X-axis direction basic symbol string and Y-axis correlation coefficients between the symbols forming the Y-axis direction symbol string and the symbols forming the Y-axis direction basic symbol stroke, and for producing X-axis degrees-of-match on the basis of said X-axis correlation coefficients and Y-axis degrees-of-match on the basis of said Y-axis correlation coefficients; and recognizing means for recognizing said character inputted to said input means on the basis of said X-axis degree-of-match and Y-axis degree-of-match.

2. A handwritten character recognition device according to claim 1, wherein said symbols comprising X-axis symbols are determined in accordance with movement distance and movement direction of a handwriting point at which the user contacts to the input unit in X-axis direction and Y-axis symbols are determined in accordance with movement distance and movement direction of the handwriting point in Y-axis direction.

3. A handwritten character recognition device according to claim 2, wherein said second storage means stores correlation coefficients between each of the X-axis symbols and correlation coefficients between each of the Y-axis symbols.

4. A handwritten character recognition device according to claim 1, wherein said degree-of-match calculating means calculates an X-axis correlation coefficient having highest correlation value for each of the symbols forming the X-axis direction symbol string, and calculates a Y-axis correlation coefficient having highest correlation value for each of the symbols forming the Y-axis direction symbol string.

5. A handwritten character recognition device according to claim 4, wherein said degree-of-match calculating means produces X-axis degree-of-match by taking an average of the X-axis correlation coefficients for each of the symbols forming the X-axis direction symbol string, and produces Y-axis degree-of-match by taking an average of the Y-axis correlation coefficients for each of the symbols forming the Y-axis direction symbol string.

6. A handwritten character recognition device according to claim 1, wherein said recognizing means determines a reference character having X-axis degree-of-match and Y-axis degree-of match higher than a predetermined value as the character inputted to said input means.

7. A handwritten character recognition device according to claim 1, wherein said input means comprises a tablet having an input surface on which a user writes the handwritten character.

8. A handwritten character recognition device according to claim 1 further comprising means for simplifying the symbols by replacing certain combinations of the symbols with a symbol indicating a vector which is close to that of the combination of the symbols.

* * * * *